(12) United States Patent
Williams et al.

(10) Patent No.: US 9,621,441 B2
(45) Date of Patent: Apr. 11, 2017

(54) METHODS AND COMPUTER PROGRAM PRODUCTS FOR ANALYSIS OF NETWORK TRAFFIC BY PORT LEVEL AND/OR PROTOCOL LEVEL FILTERING IN A NETWORK DEVICE

(75) Inventors: Nathaniel C. Williams, Durham, NC (US); Aydan R. Yumerefendi, Raleigh, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 640 days.

(21) Appl. No.: 13/545,207

(22) Filed: Jul. 10, 2012

(65) Prior Publication Data
US 2014/0019609 A1 Jan. 16, 2014

(51) Int. Cl.
*G06F 15/173* (2006.01)
*H04L 12/26* (2006.01)

(52) U.S. Cl.
CPC ............ *H04L 43/028* (2013.01); *H04L 43/18* (2013.01); *H04L 43/0817* (2013.01)

(58) Field of Classification Search
CPC ... H04L 43/028; H04L 43/18; H04L 43/0817; G06F 15/173
See application file for complete search history.

(56) References Cited

U.S. PATENT DOCUMENTS

| | | | | |
|---|---|---|---|---|
| 6,308,148 B1 * | 10/2001 | Bruins | ................... | H04L 45/00 370/401 |
| 7,299,277 B1 * | 11/2007 | Moran | ................ | H04L 41/5022 370/230 |
| 7,840,664 B2 * | 11/2010 | Dugatkin | ................ | H04L 41/00 709/224 |
| 8,208,893 B1 * | 6/2012 | Ryan | ....................... | H04L 12/10 455/405 |
| 8,694,630 B1 * | 4/2014 | Keralapura | .......... | H04L 47/2441 709/223 |
| 2002/0143928 A1 * | 10/2002 | Maltz | ...................... | H04L 29/06 709/224 |
| 2010/0287019 A1 * | 11/2010 | Guo | .................... | G06F 11/3442 709/224 |
| 2011/0055388 A1 * | 3/2011 | Yumerefendi | ...... | G06F 11/3409 709/224 |
| 2011/0302026 A1 * | 12/2011 | Kanakarajan | ....... | G06F 17/3087 705/14.45 |

(Continued)

OTHER PUBLICATIONS

Trie [online], Sep. 18, 2010 [retrieved on Dec. 21, 2010]. Retrieved from the Internet: <http://en.wikipedia.org/w/index.php?title=Trie&oldid=385495914>.

(Continued)

*Primary Examiner* — Ario Etienne
*Assistant Examiner* — Kidest Mendaye
(74) *Attorney, Agent, or Firm* — Merchant & Gould

(57) ABSTRACT

Provided are methods and computer program products for monitoring the contents of network traffic in a network device and identifying and analyzing transactional network traffic. Methods of collecting network traffic data for transactional traffic may include application of port level filtering and/or protocol level filtering. The filtering methods described herein may assist the operator in identifying transactional and infrastructure problems resulting in application performance degradation.

26 Claims, 19 Drawing Sheets

(56) References Cited

U.S. PATENT DOCUMENTS

2012/0072968 A1* 3/2012 Wysopal ............. G06F 11/3612
   726/1
2012/0290718 A1* 11/2012 Nethercutt .......... G06F 11/3006
   709/224

OTHER PUBLICATIONS

Suffix tree [online], Aug. 29, 2010 [retrieved on Dec. 21, 2010]. Retrieved from the Internet: <http://en.wikipedia.org/w/index.php?title=Suffix_tree&oldid=381775612>.
Levenshtein distance [online], Sep. 13, 2010 [retrieved on Dec. 21, 2010]. Retrieved from the Internet: <http://en.wikipedia.org/w/index.php?title=Levenshtein_distance&oldid=384505495>.
Optimizing Levenshtein distance algorithm [online], May 27, 2010 [retrieved on Dec. 21, 2010]. Retrieved from the Internet: <http://stackoverflow.com/questions/2918771/optimizing-levenshtein-distance-algorithm>.

* cited by examiner

METHODS AND COMPUTER PROGRAM PRODUCTS FOR ANALYSIS OF NETWORK TRAFFIC BY PORT LEVEL AND/OR PROTOCOL LEVEL FILTERING IN A NETWORK DEVICE

FIELD OF INVENTION

The present invention relates to computer networks and, more particularly, to network performance monitoring methods, devices, and computer program products.

BACKGROUND

The growing presence of computer networks such as intranets and extranets has brought about the development of applications in e-commerce, education, manufacturing, and other areas. Organizations increasingly rely on such applications to carry out their business, production, or other objectives, and devote considerable resources to ensuring that the applications perform as expected. To this end, various application management, monitoring, and analysis techniques have been developed.

One approach for managing an application involves monitoring the application, generating data regarding application performance, and analyzing the data to determine application health. Some system management products analyze a large number of data streams to try to determine a normal and abnormal application state. Large numbers of data streams are often analyzed because the system management products may not have a semantic understanding of the data being analyzed. Accordingly, when an unhealthy application state occurs, many data streams may have abnormal data values because the data streams are causally related to one another. Because the system management products may lack a semantic understanding of the data, they may not be able to assist the user in determining either the ultimate source or cause of a problem. Additionally, these application management systems may not know whether a change in data indicates an application is actually unhealthy or not.

Current application management approaches may include monitoring techniques such as deep packet inspection (DPI), which may be performed as a packet passes an inspection point and may include collecting statistical information, among others. Such monitoring techniques can be data-intensive and may be ineffective in providing substantively real-time health information regarding network applications. Additionally, packet trace information may be lost and application-specific code may be required.

Embodiments of the present invention are, therefore, directed towards solving these and other related problems.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Some embodiments may include determining that a network connected process is running. Based on configuration information related to the network connected process, a filtering criterion that corresponds to a network traffic type may be identified. A filtered network element metric subset may be generated based on the filtering criterion. Network traffic data associated with the filtered network element metric subset may be collected.

According to some embodiments, generating the filtered network element metric subset may comprise applying the filtering criterion to network element metrics associated with the network connected process. According to some embodiments, the application server may include a Java application server. The type of network may include transactional traffic and/or non-transactional traffic.

According to some embodiments, identifying the filtering criterion that corresponds to the network traffic type comprises identifying a port used by the network connected process. Identifying the port used by the network connected process may include identifying a Transmission Control Protocol (TCP) port number and/or a User Datagram Protocol (UDP) port number. Collecting network traffic data associated with the filtered network element metric subset may further comprise analyzing traffic on the port based on a selected protocol.

According to some embodiments, identifying the filtering criterion that corresponds to the network traffic type comprises identifying an Internet Protocol (IP) address used by the network connected process. Collecting network traffic data associated with the filtered network element metric subset may further comprise analyzing traffic to and/or from the IP address based on a selected protocol.

In some embodiments, collecting network traffic data associated with the filtered network element metric subset may comprise analyzing traffic received on the port. Analyzing traffic received on the port may include estimating at least one network element metric value corresponding to the traffic received on the port. The network element metric value may include performance data, time delay, wait time, number of stall cycles, read time, write time, number of read operations, total bytes sent, total bytes received, total response time, the number of responses from the server, percentage of CPU time, aggregate memory percentage, bytes sent/received on network interfaces, page faults, number of pages input, number of pages output, and/or queue length.

According to some embodiments, analyzing network traffic may also include receiving input associated with configuration information related to the network connected process. Receiving input associated with configuration information related to the network connected process may include receiving an input from a user via a user input interface and generating configuration data based on the input from the user. In other embodiments, receiving configuration information related to the network connected process may include reading a data file that includes the configuration information and generating configuration data based on the configuration information from the data file.

According to some embodiments, identifying the filtering criterion that corresponds to the network traffic type may include identifying a protocol used by the network connected process. Collecting network traffic data associated with the filtered network element metric subset may include analyzing network traffic based on the protocol. The protocol may include HTTP.

In some embodiments, a computer program product including a non-transitory computer usable storage medium having computer-readable program code embodied in the medium is provided. The computer-readable program code is configured to perform operations corresponding to methods described herein.

Other methods, devices, and/or computer program products according to example embodiments will be or become apparent to one with skill in the art upon review of the following drawings and detailed description. It is intended that all such additional methods, devices, and/or computer program products be included within this description, be within the scope of the present invention, and be protected by the accompanying claims.

BRIEF DESCRIPTION OF THE DRAWINGS

The present invention will now be described in more detail in relation to the enclosed drawings, in which:

FIG. 3 is a block diagram illustrating operations and/or functions of a collector application as described above regarding FIG. 1a.

DETAILED DESCRIPTION

Figure 1A:
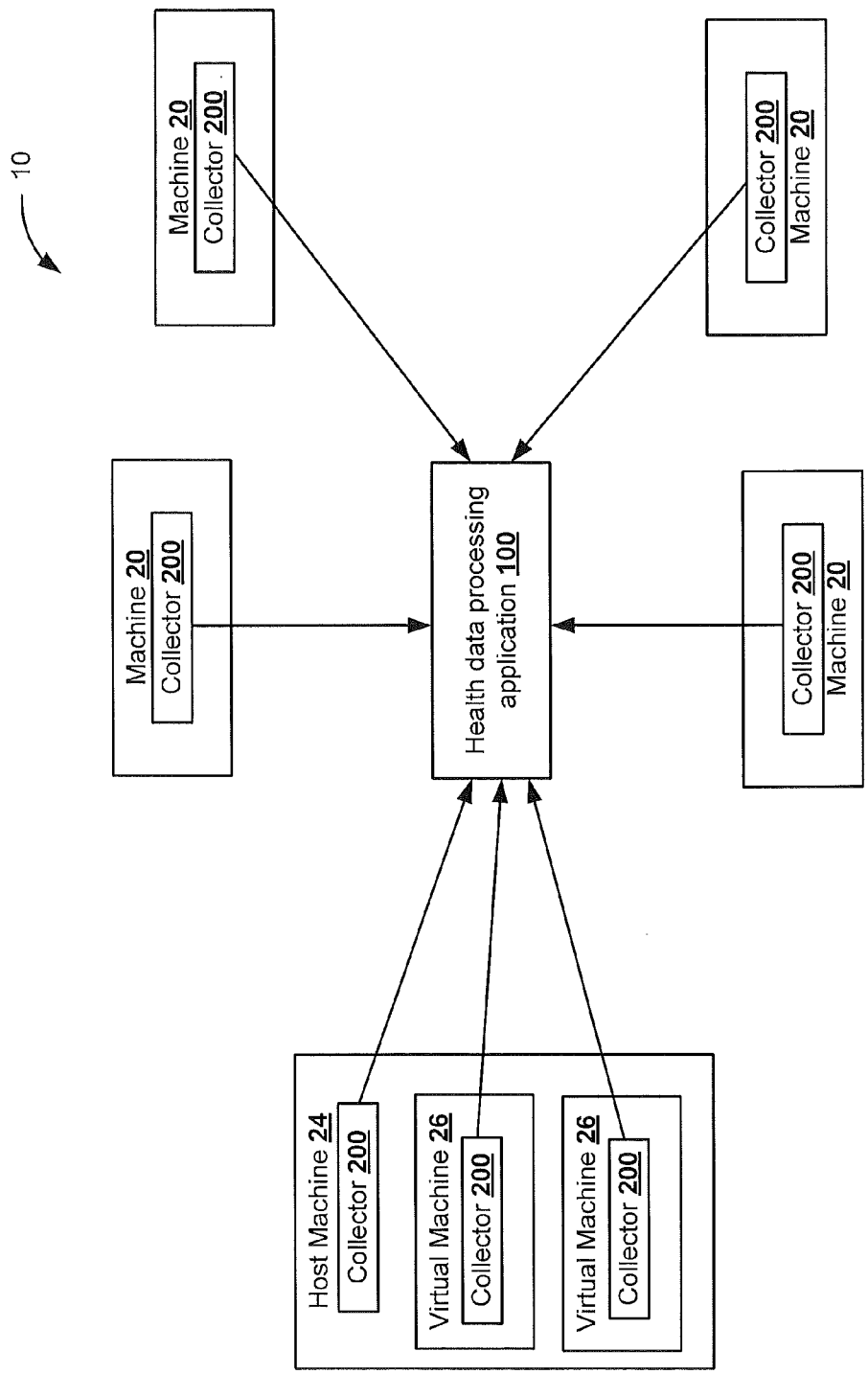
FIGS. 1a-1d are block diagrams illustrating example networks in which operations for monitoring network application performance may be performed according to some embodiments of the present invention.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail. While various modifications and alternative forms of the embodiments described herein may be made, specific embodiments are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Example embodiments are described below with reference to block diagrams and/or flowchart illustrations of methods, apparatus (systems and/or devices), and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process, such that the instructions, which execute on the computer or other programmable apparatus, provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a non-transitory computer-usable or computer-readable storage medium having computer-usable or computer-readable program code embodied in the medium for use by or in connection with an instruction execution system. In the context of this document, a non-transitory computer-usable or computer-readable medium may be any medium that can contain, store, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

Computer program code for carrying out operations of data processing systems discussed herein may be written in a high-level programming language, such as C, C++, or Java, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Reference is made to FIGS. 1*a*-1*d*, which are block diagrams illustrating example networks in which operations for monitoring and reporting network application performance may be performed according to some embodiments of the present invention.

Computing Network

Referring to FIG. 1*a*, a network 10 according to some embodiments herein may include a health data processing application 100 and a plurality of network devices 20, 24, and 26 that may each include respective collector applications 200. It is to be understood that a "network device" as discussed herein may include physical (as opposed to virtual) machines 20; host machines 24, each of which may be a physical machine on which one or more virtual machines may execute; and/or virtual machines 26 executing on host machines 24. It is to be further understood that an "application" as discussed herein refers to an instance of executable software operable to execute on respective ones of the network devices. The terms "application" and "network application" may be used interchangeably herein, regardless of whether the referenced application is operable to access network resources.

Collector applications 200 may collect data related to the performance of network applications executing on respective network devices. For instance, a collector application executing on a physical machine may collect performance data related to network applications executing on that physical machine. A collector application executing on a host machine and external to any virtual machines hosted by that host machine may collect performance data related to network applications executing on that host machine, while a collector application executing on a virtual machine may collect performance data related to network applications executing within that virtual machine.

The health data processing application 100 may be on a network device that exists within the network 10 or on an external device that is coupled to the network 10. Accordingly, in some embodiments, the network device on which the health data processing application 100 may reside may be one of the plurality of machines 20 or 24 or virtual machines 26. Communications between various ones of the network devices may be accomplished using one or more communications and/or network protocols that may provide a set of standard rules for data representation, signaling, authentication and/or error detection that may be used to send information over communications channels therebetween. In some embodiments, example network protocols may include Hypertext Transfer Protocol (HTTP), Tabular Data Stream (TDS), and/or Lightweight Directory Access Protocol (LDAP), among others.

Figure 1B:
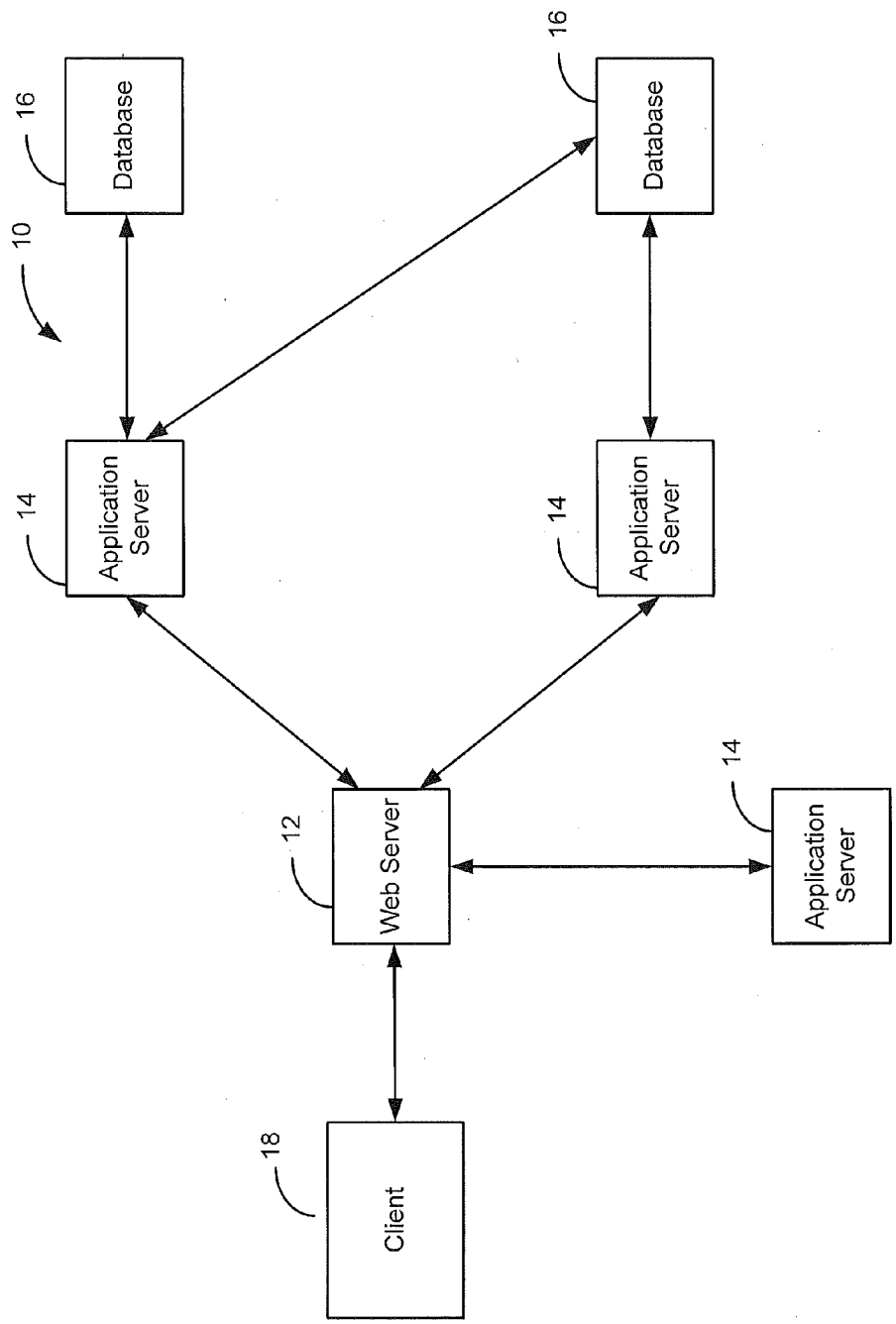

Referring to FIG. 1*b*, an example network 10 may include a web server 12, one or more application servers 14 and one or more database servers 16. Although not illustrated, a network 10 as used herein may include directory servers, security servers, and/or transaction monitors, among others. The web server 12 may be a computer and/or a computer program that is responsible for accepting HTTP requests from clients 18 (e.g., user agents such as web browsers) and serving them HTTP responses along with optional data content, which may be, for example, web pages such as HTML documents and linked objects (images, etc.). An application server 14 may include a service, hardware, and/or software framework that may be operable to provide one or more programming applications to clients in a network. Application servers 14 may be coupled to one or more web servers 12, database servers 16, and/or other application servers 14, among others. Some embodiments provide that a database server 16 may include a computer and/or a computer program that provides database services to other computer programs and/or computers as may be defined, for example by a client-server model, among others. In some embodiments, database management systems may provide database server functionality.

Some embodiments provide that the collector applications 200 and the health data processing application 100 described above with respect to FIG. 1*a* may reside on ones of the web server(s) 12, application servers 14 and/or database servers 16, among others. In some embodiments, the health data processing application 100 may reside in a dedicated computing device that is coupled to the network 10. The collector applications 200 may reside on one, some or all of the above listed network devices and provide network application performance data to the health data processing application 100.

Computing Device

Figure 1C:
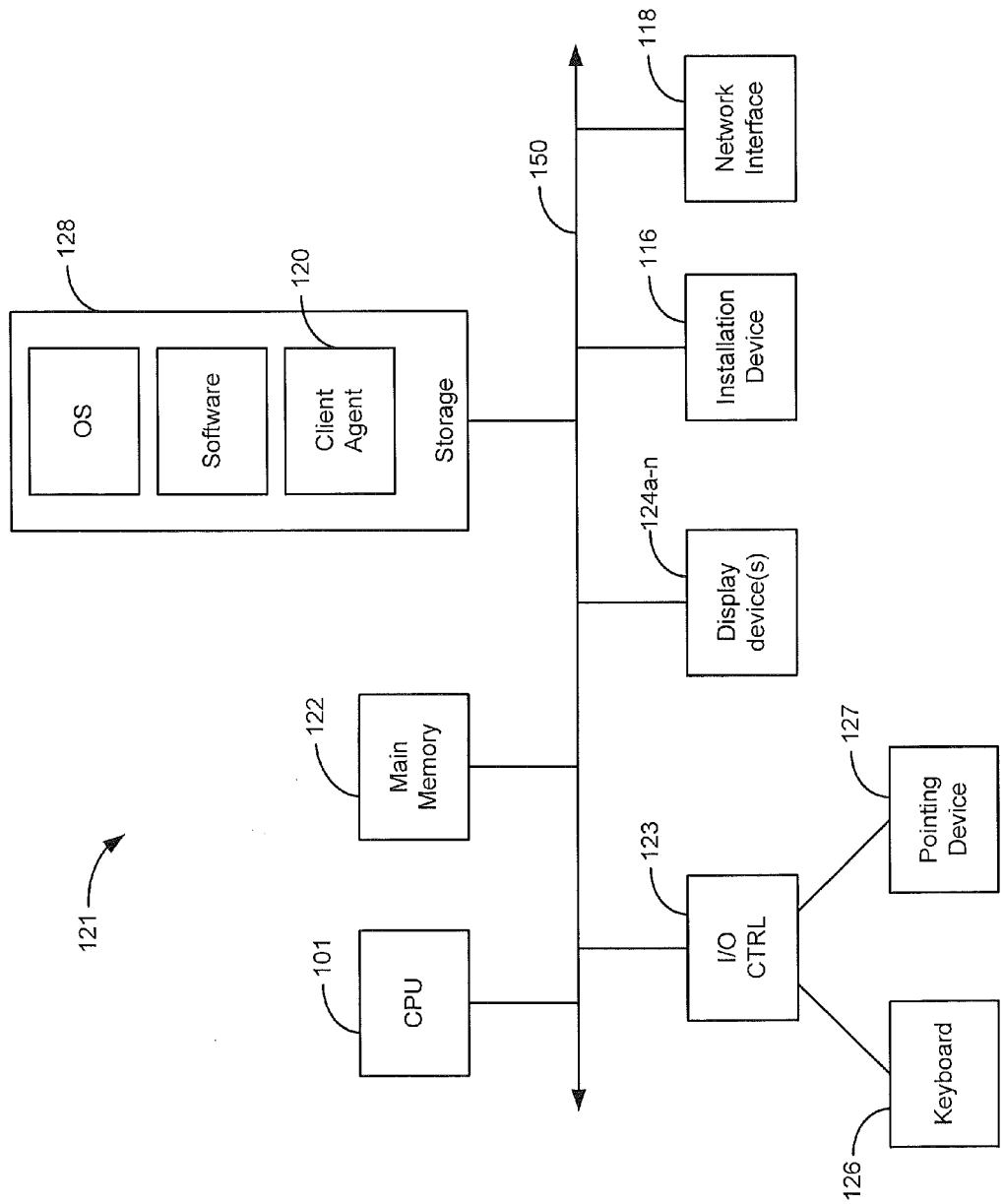
Figure 1D:
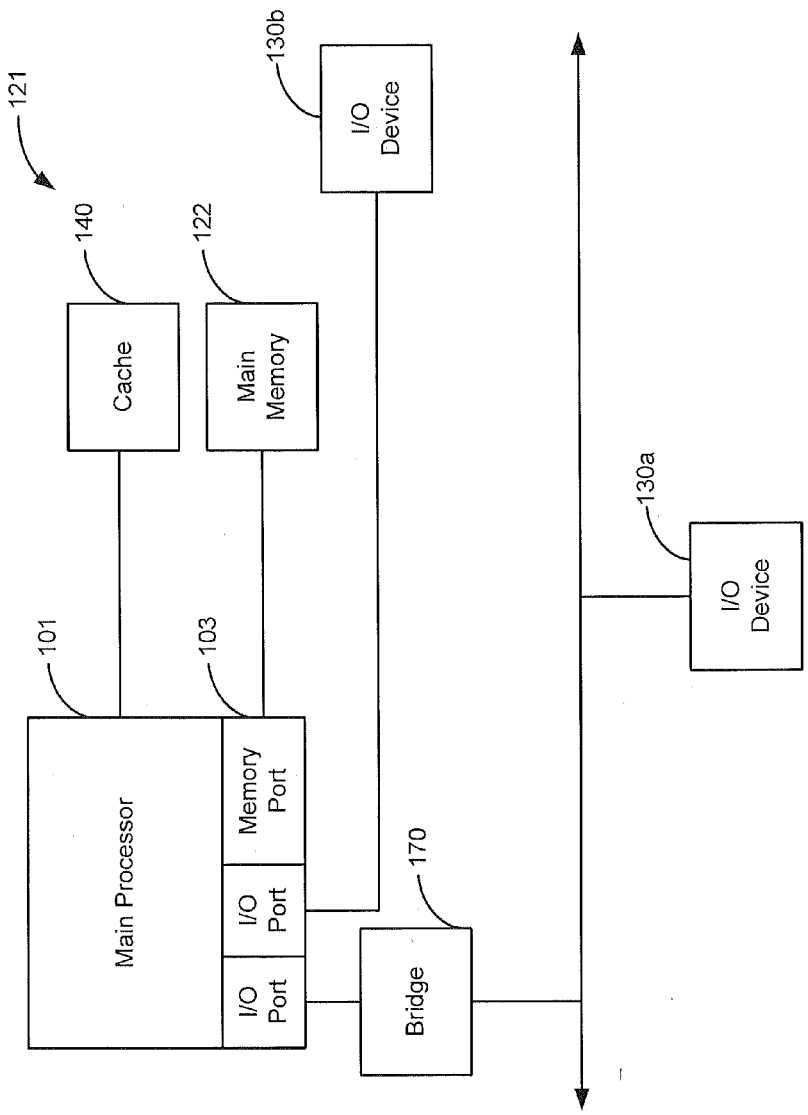

Web server(s) 12, application servers 14 and/or database servers 16 may be deployed as and/or executed on any type and form of computing device, such as a computer, network device, or appliance capable of communicating on any type and form of network and performing the operations described herein. FIGS. 1*c* and 1*d* depict block diagrams of a computing device 121 useful for practicing some embodiments described herein. Referring to FIGS. 1*c* and 1*d*, a computing device 121 may include a central processing unit 101 and a main memory unit 122. A computing device 121 may include a visual display device 124, a keyboard 126, and/or a pointing device 127, such as a mouse. Each computing device 121 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit 101 is provided by a microprocessor unit, such as: those manufactured by Intel Corporation of Mountain View, Calif.; those manufactured by Motorola Corporation of Schaumburg, Ill.; the POWER processor, those manufactured by International Business Machines of White Plains, N.Y.; and/or those manufactured by Advanced Micro Devices of Sunnyvale, Calif. The computing device 121 may be based on any of these processors, and/or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM), among others. The main memory 122 may be based on any of the above described memory chips, or any other available memory chips capable of operating as described herein. In some embodiments, the processor 101 communicates with main memory 122 via a system bus 150 (described in more detail below). In some embodiments of a computing device 121, the processor 101 may communicate directly with main memory 122 via a memory port 103. Some embodiments provide that the main memory 122 may be DRDRAM.

FIG. 1*d* depicts some embodiments in which the main processor 101 communicates directly with cache memory 140 via a secondary bus, sometimes referred to as a backside bus. In some other embodiments, the main processor 101 may communicate with cache memory 140 using the system bus 150. Cache memory 140 typically has a faster response time than main memory 122 and may be typically provided by SRAM, BSRAM, or EDRAM. In some embodiments, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, and/or a NuBus, among others. For embodiments in which the I/O device is a video display 124, the processor 101 may use an Advanced Graphics Port (AGP) to communicate with the display 124. FIG. 1*d* depicts some embodiments of a computer 100 in which the main processor 101 communicates directly with I/O device 130 via HyperTransport, Rapid I/O, or InfiniBand. FIG. 1*d* also depicts some embodiments in which local busses and direct communication are mixed: the processor 101 communicates with I/O device 130*a* using a local interconnect bus while communicating with I/O device 130*b* directly.

The computing device 121 may support any suitable installation device 116, such as a floppy disk drive for receiving floppy disks such as 3.5-inch, 5.25-inch disks, or ZIP disks, a CD-ROM drive, a CD-R/RW drive, a DVD-ROM drive, tape drives of various formats, USB device, hard disk drive (HDD), solid-state drive (SSD), or any other device suitable for installing software and programs such as any client agent 120, or portion thereof. The computing device 121 may further comprise a storage device 128, such as one or more hard disk drives or solid-state drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 121 may include a network interface 118 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., ISDN, Frame Relay, ATM), wireless connections (e.g., IEEE 802.11), or some combination of any or all of the above. The network interface 118 may comprise a built-in network adapter, network interface card, PCMCIA network card, card bus network adapter, wireless network adapter, USB network adapter, modem, or any other device suitable for interfacing the computing device 121 to any type of network capable of communication and performing the operations described herein. A wide variety of I/O devices 130a-130n may be present in the computing device 121. Input devices include keyboards, mice, trackpads, trackballs, microphones, and drawing tablets, among others. Output devices include video displays, speakers, inkjet printers, laser printers, and dye-sublimation printers, among others. The I/O devices 130 may be controlled by an I/O controller 123 as shown in FIG. 1c. The I/O controller may control one or more I/O devices such as a keyboard 126 and a pointing device 127, e.g., a mouse or optical pen. Furthermore, an I/O device may also provide storage 128 and/or an installation medium 116 for the computing device 121. In still other embodiments, the computing device 121 may provide USB connections to receive handheld USB storage devices such USB flash drives.

In some embodiments, the computing device 121 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable, or provide for the connection and use of multiple display devices 124a-124n by the computing device 121. For example, the computing device 121 may include any type and/or form of video adapter, video card, driver, and/or library to interface, communicate, connect or otherwise use the display devices 124a-124n. In some embodiments, a video adapter may comprise multiple connectors to interface to multiple display devices 124a-124n. In some other embodiments, the computing device 121 may include multiple video adapters, with each video adapter connected to one or more of the display devices 124a-124n. In some embodiments, any portion of the operating system of the computing device 121 may be configured for using multiple displays 124a-124n. In some embodiments, one or more of the display devices 124a-124n may be provided by one or more other computing devices connected to the computing device 121, for example, via a network. Such embodiments may include any type of software designed and constructed to use another computer's display device as a second display device 124a for the computing device 121. One ordinarily skilled in the art will recognize and appreciate the various ways and embodiments that a computing device 121 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, and/or a Serial Attached small computer system interface bus, among others.

A computing device 121 of the sort depicted in FIGS. 1c and 1d may typically operate under the control of operating systems, which control scheduling of tasks and access to system resources. The computing device 121 can be running any operating system such as any of the versions of the Microsoft® Windows operating systems, any of the different releases of the Unix and Linux operating systems, any version of the Mac OS® for Macintosh computers, any embedded operating system, any real-time operating system, any open source operating system, any proprietary operating system, any operating systems for mobile computing devices, and/or any other operating system capable of running on a computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, WINDOWS 7.0, WINDOWS SERVER 2003, and/or WINDOWS SERVER 2008, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Red Hat of Raleigh, N.C., among others, or any type and/or form of a Unix operating system, among others.

In some embodiments, the computing device 121 may have different processors, operating systems, and input devices consistent with the device. For example, in one embodiment the computing device 121 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 121 can be any workstation, desktop computer, laptop, or notebook computer, server, handheld computer, mobile telephone, any other computer, or other form of computing or telecommunications device that is capable of communication and that has sufficient processor power and memory capacity to perform the operations described herein.

Architecture

Figure 2:
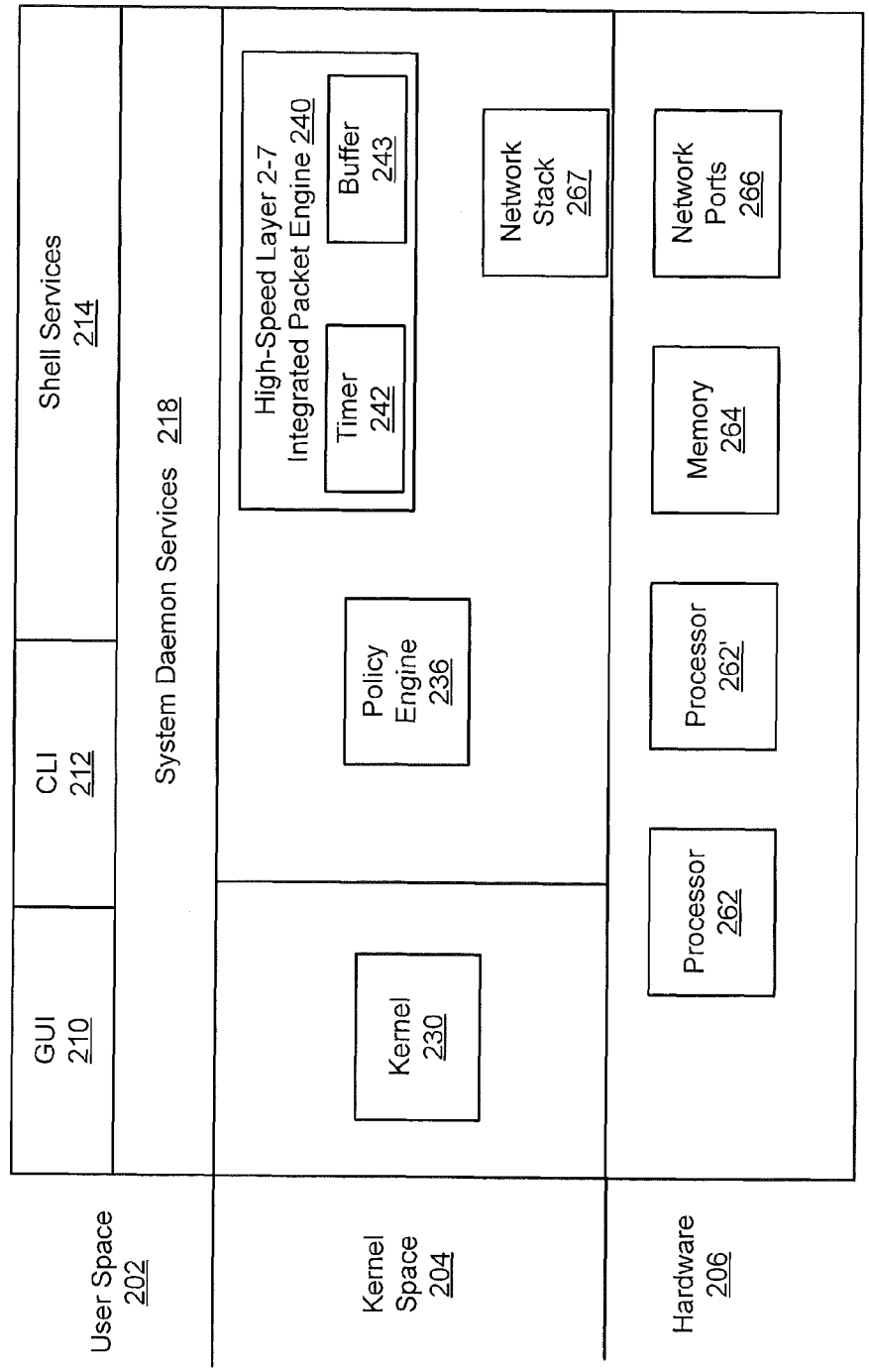
FIG. 2 is a block diagram illustrating an architecture of a computing device as discussed above regarding FIGS. 1c and 1d.

Reference is now made to FIG. 2, which is a block diagram illustrating an architecture of a computing device 121 as discussed above regarding FIGS. 1c and 1d. The architecture of the computing device 121 is provided by way of illustration only and is not intended to be limiting. The architecture of computing device 121 may include a hardware layer 206 and a software layer divided into a user space 202 and a kernel space 204.

Hardware layer 206 may provide the hardware elements upon which programs and services within kernel space 204 and user space 202 are executed. Hardware layer 206 also provides the structures and elements that allow programs and services within kernel space 204 and user space 202 to communicate data both internally and externally with respect to computing device 121. The hardware layer 206 may include a processing unit 262 for executing software programs and services, a memory 264 for storing software and data, and network ports 266 for transmitting and receiving data over a network. Additionally, the hardware layer 206 may include multiple processors for the processing unit 262. For example, in some embodiments, the computing device 121 may include a first processor 262 and a second processor 262', In some embodiments, the processor 262 or 262' includes a multi-core processor. The processor 262 may include any of the processors 101 described above in connection with FIGS. 1c and 1d.

Although the hardware layer 206 of computing device 121 is illustrated with certain elements in FIG. 2, the hardware portions or components of computing device 121 may include any type and form of elements, hardware or software, of a computing device, such as the computing device 121 illustrated and discussed herein in conjunction with FIGS. 1c and 1d. In some embodiments, the computing device 121 may comprise a server, gateway, router, switch, bridge, or other type of computing or network device, and have any hardware and/or software elements associated therewith.

The operating system of computing device 121 allocates, manages, or otherwise segregates the available system memory into kernel space 204 and user space 202. As discussed above, in the example software architecture, the operating system may be any type and/or form of various ones of different operating systems capable of running on the computing device 121 and performing the operations described herein.

The kernel space 204 may be reserved for running the kernel 230, including any device drivers, kernel extensions, and/or other kernel related software. As known to those skilled in the art, the kernel 230 is the core of the operating system, and provides access, control, and management of resources and hardware-related elements of the applications. In accordance with some embodiments of the computing device 121, the kernel space 204 also includes a number of network services or processes working in conjunction with a cache manager sometimes also referred to as the integrated cache. Additionally, some embodiments of the kernel 230 will depend on embodiments of the operating system installed, configured, or otherwise used by the device 121.

In some embodiments, the device 121 includes one network stack 267, such as a TCP/IP based stack, for communicating with a client and/or a server. In other embodiments, the device 121 may include multiple network stacks. In some embodiments, the network stack 267 includes a buffer 243 for queuing one or more network packets for transmission by the computing device 121.

As shown in FIG. 2, the kernel space 204 includes a high-speed layer 2-7 integrated packet engine 240 and a policy engine 236. Running packet engine 240 and/or policy engine 236 in kernel space 204 or kernel mode instead of the user space 202 improves the performance of each of these components, alone and in combination. Kernel operation means that packet engine 240 and/or policy engine 236 run in the core address space of the operating system of the device 121. For example, data obtained in kernel mode may not need to be passed or copied to a process or thread running in user mode, such as from a kernel level data structure to a user level data structure. In this regard, such data may be difficult to determine for purposes of network application performance monitoring. In another aspect, the number of context switches between kernel mode and user mode are also reduced. Additionally, synchronization of and communications between packet engine 240 and/or policy engine 236 can be performed more efficiently in the kernel space 204.

In some embodiments, any portion of the packet engine 240 and/or policy engine 236 may run or operate in the kernel space 204, while other portions of packet engine 240 and/or policy engine 236 may run or operate in user space 202. In some embodiments, the computing device 121 uses a kernel-level data structure providing access to any portion of one or more network packets, for example, a network packet comprising a request from a client or a response from a server. In some embodiments, the kernel-level data structure may be obtained by the packet engine 240 via a transport layer driver interface (TDI) or filter to the network stack 267. The kernel-level data structure may include any interface and/or data accessible via the kernel space 204 related to the network stack 267, network traffic, or packets received or transmitted by the network stack 267. In some embodiments, the kernel-level data structure may be used by packet engine 240 and/or policy engine 236 to perform the desired operation of the component or process. Some embodiments provide that packet engine 240 and/or policy engine 236 is running in kernel mode 204 when using the kernel-level data structure, while in some other embodiments, the packet engine 240 and/or policy engine 236 is running in user mode when using the kernel-level data structure. In some embodiments, the kernel-level data structure may be copied or passed to a second kernel-level data structure, or any desired user-level data structure.

A policy engine 236 may include, for example, an intelligent statistical engine or other programmable application(s). In some embodiments, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In some embodiments, the policy engine 236 may include any logic, rules, functions or operations to determine and provide access, control and management of objects, data or content being cached by the computing device 121 in addition to access, control and management of security, network traffic, network access, compression, and/or any other function or operation performed by the computing device 121.

High speed layer 2-7 integrated packet engine 240, also generally referred to as a packet processing engine or packet engine, is responsible for managing the kernel-level processing of packets received and transmitted by computing device 121 via network ports 266. The high speed layer 2-7 integrated packet engine 240 may include a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 may work in conjunction with policy engine 236. In particular, policy engine 236 is configured to perform functions related to traffic management such as request-level content switching and request-level cache redirection.

The high speed layer 2-7 integrated packet engine 240 includes a packet processing timer 242. In some embodiments, the packet processing timer 242 provides one or more time intervals to trigger the processing of incoming (i.e., received) or outgoing (i.e., transmitted) network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms, or ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated and/or in communication with the policy engine 236 during operation. As such, any of the logic, functions, or operations of the policy engine 236 may be performed responsive to the packet processing timer 242 and/or the packet engine 240. Therefore, any of the logic, functions, and/or operations of the policy engine 236 may be performed at the granularity of time intervals provided via the packet processing timer 242, for example, at a time interval of less than or equal to 10 ms.

In contrast to kernel space 204, user space 202 is the memory area or portion of the operating system used by user mode applications or programs otherwise running in user mode. Generally, a user mode application may not access kernel space 204 directly, and instead must use service calls in order to access kernel services. As shown in FIG. 2, user space 202 of computing device 121 includes a graphical user interface (GUI) 210, a command line interface (CLI) 212, shell services 214, and daemon services 218. Using GUI 210 and/or CLI 212, a system administrator or other user may interact with and control the operation of computing device 121. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, and/or ksh type shell. The shell services 214 may include the programs, services, tasks, processes and/or executable instructions to support interaction with the computing device 121 or operating system by a user via the GUI 210 and/or CLI 212.

Daemon services 218 are programs that run continuously or in the background and handle periodic service requests received by computing device 121. In some embodiments, a daemon service may forward the requests to other programs or processes, such as another daemon service 218 as appropriate. As known to those skilled in the art, a daemon service 218 may run unattended to perform continuous and/or periodic system wide functions, such as network control, or to perform any desired task. In some embodiments, one or more daemon services 218 run in the user space 202, while in other embodiments, one or more daemon services 218 run in the kernel space.

Collector Application

Figure 3:
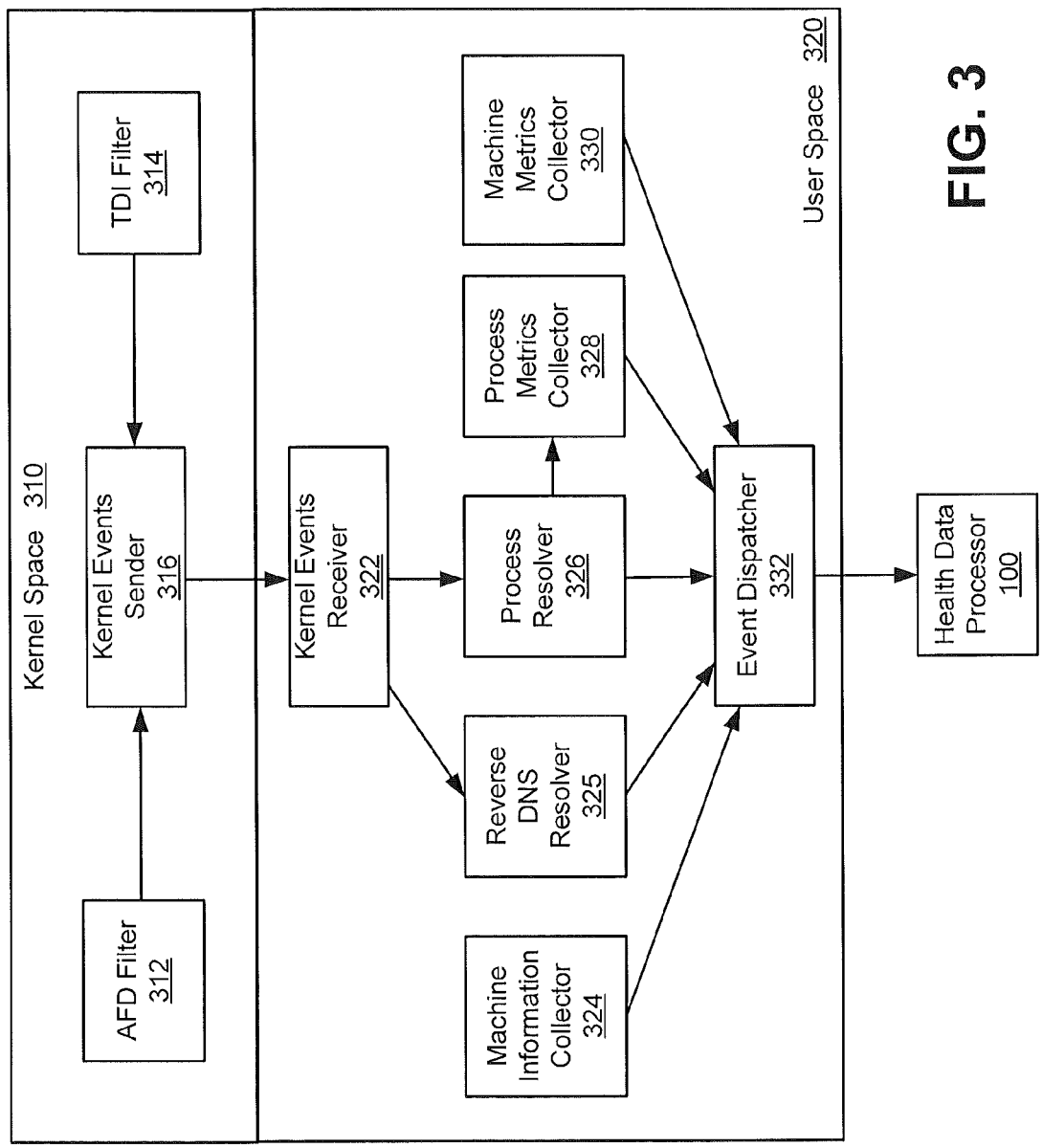

Reference is now made to FIG. 3, which is a block diagram illustrating operations and/or functions of a collector application 200 as described above regarding FIG. 1a. The collector application 200 includes a kernel space module 310 and a user space module 320. The kernel space module 310 may generally operate to intercept network activities as they occur. Some embodiments provide that the kernel space module 310 may use a kernel mode interface in the operating system, such as, for example, Microsoft Windows transport data interface (TDI). The kernel space module 310 may include a TDI filter 314 that is configured to monitor and/or intercept interactions between applications. Additionally, some embodiments provide that the kernel space module 310 may include an ancillary functions driver (AFD) filter 312 that is configured to intercept read operations and the time of their duration. Some operating systems may include a kernel mode driver other than the AFD. In this regard, operations described herein may be used with other such kernel mode drivers to intercept application operational data The raw data related to the occurrence of and attributes of transactions between network applications may be generally referred to as "performance data." The raw data may have value for diagnosing network application performance issues and/or for identifying and understanding the structure of the network applications. The measurements or aggregations of performance data may be generally referred to as "metrics" or "performance metrics." Performance data and the metrics generated therefrom may be temporally relevant (in other words, the performance data and the metrics may be directly related to and/or indicative of the health of the network at the time the performance data is collected). Performance data may be collected, and metrics based thereon may be generated, on a client side and/or a server side of an interaction. Some embodiments provide that performance data is collected in substantially real-time. In this context, "substantially real-time" means that performance data is collected immediately subsequent to the occurrence of the related network activity, subject to the delays inherent in the operation of the computing device and/or the network and in the method of collection. The performance data collected and/or the metrics generated may correspond to a predefined time interval. For example, a time interval may be defined according to the dynamics of the network and may include example period lengths of less than 1, 1, 5, 10, 15, 20, 30, and/or 60, seconds, among others.

Example client side metrics may be aggregated according to one or more applications or processes. For example, the client side metrics may be aggregated according to destination address, port number, and a local process identifier (PID). A PID may be a number used by some operating system kernels to uniquely identify a process. This number may be used as a parameter in various function calls allowing processes to be manipulated, such as adjusting the process's priority and/or terminating the process. In this manner, multiple connections from the same application or process to the same remote service may be aggregated.

Similarly, server side metrics may be aggregated according to the same application or service regardless of the client. For example, some embodiments provide that server side metrics may be aggregated according to local address, port number, and PID. Respective ones of the client side and server side metrics may be collected from the kernel space and/or user space.

The kernel space module 310 may include a kernel events sender 316 that is configured to receive performance data from the AFD filter 312 and/or the TDI filter 314, and generate metrics based on the performance data for receipt by a kernel events receiver 322 in the user space module 320. In the user space module 320, metrics data received by the kernel event receiver 322 may be processed by a reverse domain name system (DNS) resolver 325 to map an observed network address to a more user-friendly DNS name. Additionally, metrics data received by the kernel events receiver 322 may be used by a process resolver 326 to determine the processes and/or applications corresponding to the collected kernel metrics data.

The user space module 320 may include a machine information collector 324 that is operable to determine static machine information, such as, for example, CPU speed, memory capacity, and/or operating system version, among others. As the performance data is collected corresponding to applications and/or processes, the machine information may be non-correlative relative to the applications and/or processes. The user space module 320 may include a process data collector 328 that collects data corresponding to the processes and/or applications determined in the process resolver 326. A machine performance data collector 330 may collect machine specific performance data. Examples of machine data may include information about resource utilization such as the amount of memory in use and/or the percentage of available CPU time consumed. The user space module 320 may include an event dispatcher 332 that is configured to receive the machine information, resolved DNS information, process identification, process data, and/or machine data, and to generate events incorporating the aggregated metrics data for dispatch to a health data processor application 100 that is operable to receive aggregated metrics data from multiple collectors 200.

Some embodiments provide that the performance data collected and/or metrics generated may be diagnostically equivalent and, thus, may be aggregated into a single event. The identification process may depend on which application initiates a network connection and which end of the connection is represented by a current collector application host.

Figure 4:
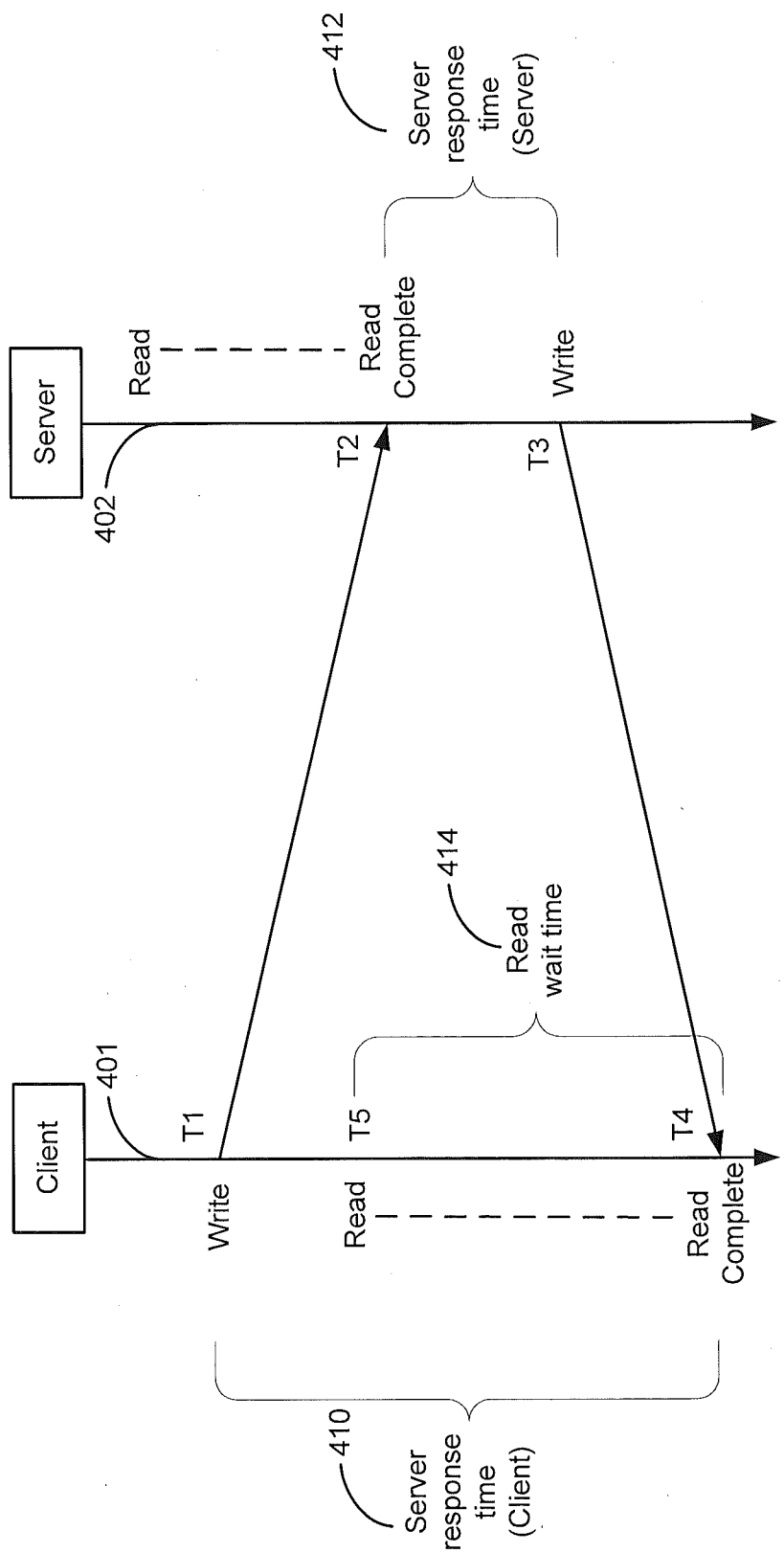
FIG. 4 is a diagram illustrating determining a read wait time corresponding to a user transaction according to some embodiments of the present invention.

Kernel level metrics may generally include data corresponding to read operations that are in progress. For example, reference is now made to FIG. 4, which is a diagram illustrating determining a read wait time corresponding to a user transaction according to some embodiments of the present invention. A user transaction between a client 401 and a server 402 are initiated when the client 401 sends a write request at time T1 to the server 402. The server 402 completes reading the request at time T2 and responds to the request at time T3 and the client 401 receives the response from the server 402 at time T4. A kernel metric that may be determined is the amount of time spent between beginning a read operation and completing the read operation. In this regard, client measured server response time 410 is the elapsed time between when the request is sent (T1) and when a response to the request is read (T4) by the client. Accordingly, the client measured server response time 410 may be determined as T4-T1. The server 402 may determine a server measured server response time 412 that is the elapsed time between when the request is read (T2) by the server 402 and when the response to the request is sent (T3) by the server 402 to the client 401. Accordingly, the server measured server response time 412 may be determined as T3-T2.

As the application response is measured in terms of inbound and outbound packets, the application response time may be determined in an application agnostic manner.

Additionally, another metric that may be determined is the read wait time 414, which is the elapsed time between when the client 401 is ready to read a response to the request T5 and when the response to the request is actually read T4. In some embodiments, the read wait time may represent a portion of the client measured server response time 410 that may be improved upon by improving performance of the server 402. Further, the difference between the client measured server response time 410 and the server measured server response time 412 may be used to determine the total transmission time of the data between the client 401 and the server 402. Some embodiments provide that the values may not be determined until a read completes. In this regard, pending reads may not be included in this metric. Further, as a practical matter, higher and/or increasing read time metrics discussed above may be indicative of a slow and/or poor performing server 402 and/or protocol where at least some messages originate unsolicited at the server 402.

Other read metrics that may be determined include the number of pending reads. For example, the number of read operations that have begun but are not yet completed may be used to detect high concurrency. In this regard, high and/or increasing numbers of pending read operations may indicate that a server 402 is not keeping up with the workload. Some embodiments provide that the total number of reads may include reads that began at a time before the most recent aggregated time period.

Additionally, some embodiments provide that the number of reads that were completed during the last time period may be determined. An average of read wait time per read may be generated by dividing the total read wait time, corresponding to a sum of all of the T4-T5 values during the time period, by the number of completed reads in that period.

In some embodiments, the number of stalled reads may be determined as the number of pending reads that began earlier than a predefined threshold. For example, a predefined threshold of 60 seconds may provide that the number of pending read operations that began more than 60 seconds ago are identified as stalled read operations. Typically, any value greater than zero may be undesirable and/or may be indicative of a server-initiated protocol. Some embodiments may also determine the number of bytes sent/received on a connection.

The number of completed responses may be estimated as the number of times a client-to-server message (commonly interpreted as a request) was followed by a server-to-client message (commonly interpreted as a response). Some embodiments provide that this may be measured by both the server and the client connections. In some embodiments, this may be the same as the number of completed reads for a given connection. Additionally, a total response time may be estimated as the total time spent in request-to-response pairs.

Figure 5:
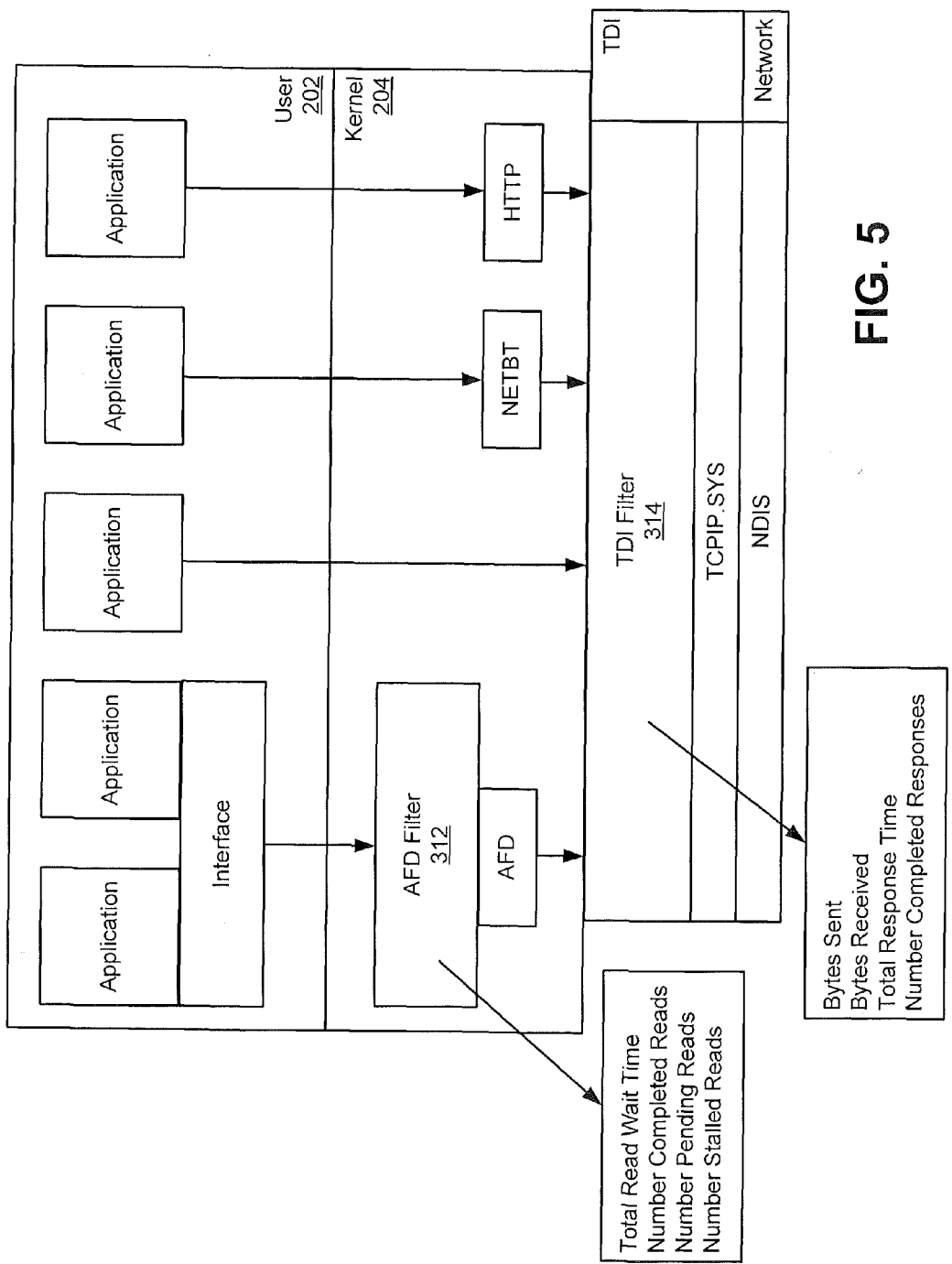
FIG. 5 is a block diagram illustrating a kernel level architecture of a collector application to explain kernel level metrics according to some embodiments of the present invention.

Reference is now made to FIG. 5, which is a block diagram illustrating a kernel level architecture of a collector application 200 to explain kernel level metrics according to some embodiments of the present invention. As discussed above, regarding FIG. 3, the collector may use a TDI filter 314 and an AFD filter 312. The AFD filter 312 may intercept network activity from user space processes that use a library defined in a standard interface between a client application and an underlying protocol stack in the kernel.

The TDI filter 314 may operate on a lower layer of the kernel and can intercept all network activity. As the amount of information available at AFD filter 312 and TDI filter 314 is different, the performance data that may be collected and the metrics that may be generated using each may also be different. For example, the AFD filter 312 may collect AFD performance data and generate AFD metrics that include total read wait time, number of completed reads, number of pending reads and number of stalled reads, among others. The TDI filter may collect TDI performance data and generate TDI metrics including total bytes sent, total bytes received, total response time and the number of responses from the server. Depending on the architecture of a target application, the AFD metrics for client-side connections may or may not be available. In this regard, if the application uses the standard interface, the collector may report non-zero AFD metrics. Otherwise, all AFD metrics may not be reported or may be reported as zero.

Some embodiments provide that kernel level metrics may be generated corresponding to specific events. Events may include read wait metrics that may include client side metrics such as total read wait time, number of completed reads, number of pending reads, number of stalled reads, bytes sent, bytes received, total response time, and/or number of responses, among others. Events may further include server response metrics such as bytes sent, bytes received, total response time and/or number of responses, among others.

In addition to the kernel metrics discussed above, the collector 200 may also generate user level metrics. Such user level metrics may include, but are not limited to aggregate CPU percentage (representing the percentage of CPU time across all cores), aggregate memory percentage (i.e., the percentage of physical memory in use by a process and/or all processes), and/or total network bytes sent/received on all network interfaces, among others. User level metrics may include, but are not limited to, the number of page faults (the number of times any process tries to read from or write to a page that was not in its resident in memory), the number of pages input (i.e., the number of times any process tried to read a page that had to be read from disk), and/or the number of pages output (representing the number of pages that were evicted by the operating system memory manager because it was low on physical memory), among others. User level metrics may include, but are not limited to, a queue length (the number of outstanding read or write requests at the time the metric was requested), the number of bytes read from and/or written to a logical disk in the last time period, the number of completed read/write requests on a logical disk in the last time period, and/or total read/write wait times (corresponding to the number of milliseconds spent waiting for read/write requests on a logical disk in the last time interval), among others.

Further, some additional metrics may be generated using data from external application programming interfaces. Such metrics may include, for example: the amount of memory currently in use by a machine memory control driver; CPU usage expressed as a percentage; memory currently used as a percentage of total memory; and/or total network bytes sent/received, among others.

In some embodiments, events may be generated responsive to certain occurrences in the network. For example events may be generated: when a connection, such as a TCP connection, is established from or to a machine; when a connection was established in the past and the collector application 200 first connects to the health data processing application 100; and/or when a connection originating from the current machine was attempted but failed due to timeout, refusal, or because the network was unreachable. Events may be generated when a connection is terminated; when a local server process is listening on a port; when a local server process began listening on a port in the past and the collector application 200 first connects to the health data processing application 100; and/or when a local server process ceases to listen on a port. Events may be generated if local network interfaces have changed and/or if a known type of event occurs but some fields are unknown. Events may include a description of the static properties of a machine when a collector application 200 first connects to a health data processing application 100; process information data when a process generates its first network-related event; and/or information about physical disks and logical disks when a collector application 200 first connects to a health data processing application 100, Some embodiments provide that the different link events may include different data types corresponding to the type of information related thereto. For example, data strings may be used for a type description of an event. Other types of data may include integer, bytes and/or Boolean, among others.

In some embodiments, the events generated by collector application 200 for dispatch to heath data processing application 100 may incorporate metrics related to network structure, network health, computational resource health, virtual machine structure, virtual machine health, and/or process identification, among others. Metrics related to network structure may include data identifying the network device on which collector application 200 is executing, or data related to the existence, establishment, or termination of network links, or the existence of bound ports or the binding or unbinding of ports. Metrics pertinent to network health may include data related to pending, completed, and stalled reads, bytes transferred, and response times, from the perspective of the client and/or the server side. Metrics related to computational resource health may include data regarding the performance of the network device on which collector application 200 is executing, such as processing and memory usage. Metrics related to virtual machine structure may include data identifying the physical host machine on which collector application 200 is executing, and/or data identifying the virtual machines executing on the physical host machine. Metrics pertinent to virtual machine health may include regarding the performance of the host machine and/or the virtual machines executing on the host machine, such as processing and memory usage as determined from the perspective of the host machine and/or the virtual machines. Finally, metrics related to process identification may include data identifying individual processes executing on a network device.

Figure 6:
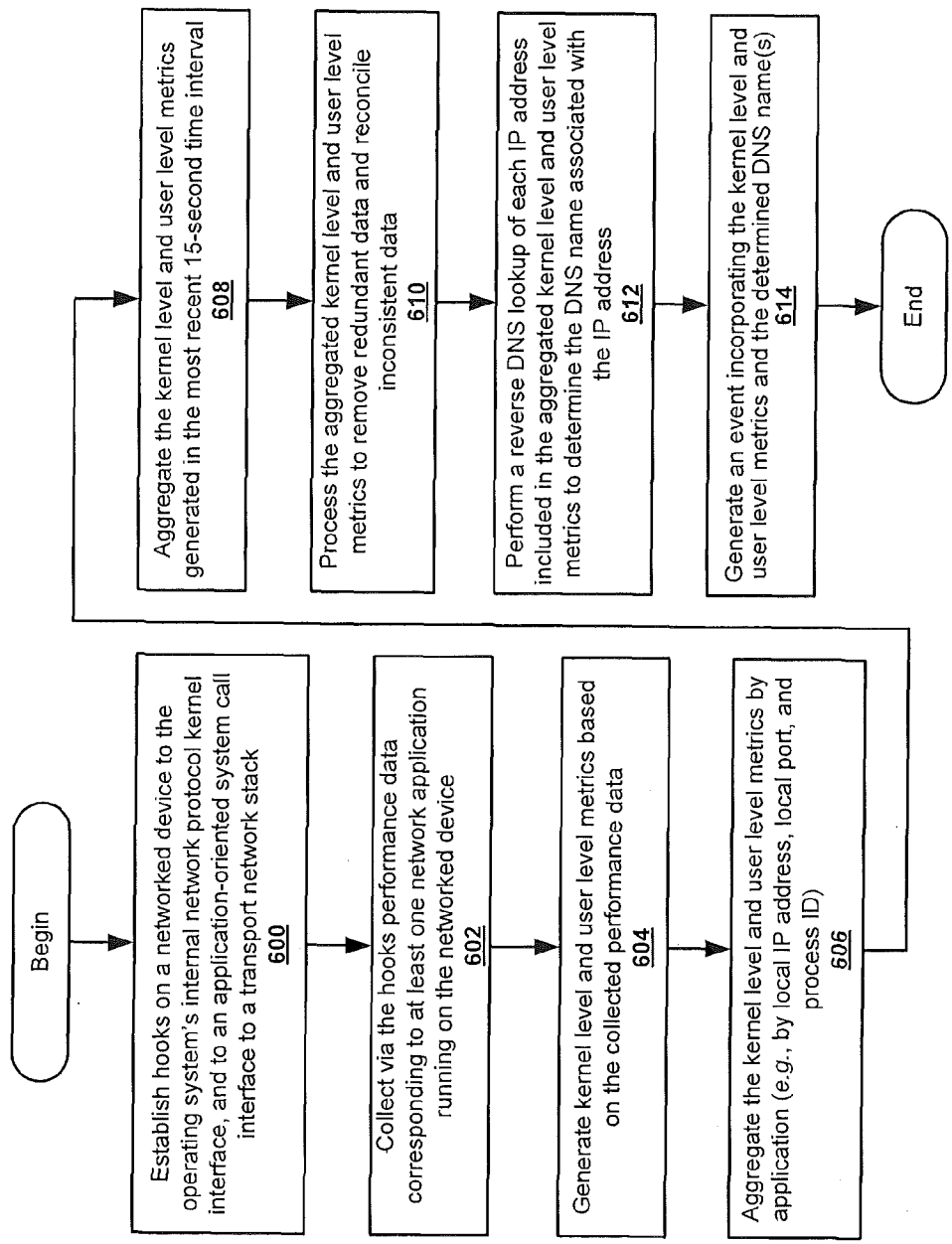
FIG. 6 is a flowchart illustrating example operations carried out by a collector application in monitoring and reporting network application performance according to some embodiments of the present invention.

Reference is made to FIG. 6, which illustrates example operations that may be carried out by collector application 200 in monitoring and reporting network application performance according to some embodiments of the present invention. At block 600, collector application 200 establishes hooks on a networked device to an internal network protocol kernel interface utilized by the operating system of the networked device. In some embodiments, these hooks may include, for instance, a TDI filter. Collector application 200 also establishes hooks to an application oriented system call interface to a transport network stack. The hooks may include, in some embodiments, an AFD filter. Collector application 200 collects, via the established hooks, performance data corresponding to at least one network application running on the networked device (block 602). At block 604, kernel level and user level metrics are generated based on the collected performance data. The generated metrics may provide an indication of the occurrence of an interaction (e.g., establishment of a network link), or may provide measurements of, for instance, a count of some attribute of the collected performance data (e.g., number of completed reads) or a summation of some attribute of the collected performance data (e.g., total read attempts). The kernel level and user level metrics are aggregated by application—e.g., by aggregating metrics associated with the same IP address, local port, and process ID (block 606). At block 608, the kernel level and user level metrics generated within a specified time interval are aggregated. For instance, in some embodiments, metrics generated within the most recent 15-second time interval are aggregated.

At block 610, redundant data is removed from the aggregated metrics, and inconsistent data therein is reconciled. Redundant data may include, for instance, functionally equivalent data received from both the TDI and AFD filters. Collector application 200 performs a reverse DNS lookup to determine the DNS name associated with IP addresses referenced in the generated kernel level and user level metrics (block 612). Finally, at block 614, an event is generated, incorporating the kernel level and user level metrics and the determined DNS name(s). The generated event may be subsequently transmitted to health data processing application 100 for incorporation into a model of network health status.

Installation without Interruption

In some embodiments, the collector application 200 may be installed into a machine of interest without requiring a reboot of the machine. This may be particularly useful in the context of a continuously operable system, process and/or operation as may be frequently found in manufacturing environments, among others. As the collector operations interface with the kernel, and more specifically, the protocol stack, installation without rebooting may include intercepting requests coming in and out of the kernel using the TDI filter. Some embodiments include determining dynamically critical offsets in potentially undocumented data structures. Such offsets may be used in intercepting network activity for ports and connections that exist prior to an installation of the collector application 200. For example, such previously existing ports and connections may be referred to as the extant state of the machine.

Some embodiments provide that intercepting the stack data may include overwriting the existing stack function tables with pointers and/or memory addresses that redirect the request through the collector filter and then to the intended function. In some embodiments, the existing stack function tables may be overwritten atomically in that the overwriting may occur at the smallest indivisible data level. Each entry in a function table may generally include a function pointer and a corresponding argument. However, only one of these entries (either the function or the argument) can be overwritten at one time. Thus, intercepting function calls may rely on two consecutive overwrites of the stack data corresponding to the function and corresponding argument. In some embodiments, there is no means for protecting from an intervening operation between overwriting one of the function and argument and overwriting the other one of them. In this regard, system stability may be at risk from two attempted consecutive overwrites.

As the consecutive overwrites of intercepting function calls may place the machine at risk of instability, a dynamic overwriting operation may be used. Specifically, a separate data structure is provided that includes a pointer to the original function, its original argument and dynamically generated code to call a filter in the collector application 200. The address of this data structure may be used to atomically overwrite the original function pointer in a single operation. The collector collects the data and then calls the original function corresponding to the overwritten stack data to perform its intended purpose. In this manner, the original behavior of the machine is preserved and the collector application collects the relevant data without rebooting the machine and/or placing the machine at risk of instability.

Some embodiments may include identifying the potentially undocumented data structures representing bound ports and network connections. For example, TDI objects (connections and bound ports) created prior to the installation of the collector application 200 may be determined by first enumerating all objects identified in a system. Each of the enumerated objects may be tagged with an identifier corresponding to its sub-system. A request corresponding to a known TDI object is created and sent for processing. The type codes of the enumerated objects are compared to those of the known TDI object to determine which of the objects are ports and which of the objects are connections. The enumerated objects may then be filtered as either connections or ports.

In some embodiments, this may be accomplished using an in-kernel thread. The thread may monitor network connections having restricted visibility and may detect when a monitored connection no longer exists. Connections may be added dynamically to the monitored list as needed.

Some embodiments provide that events may be generated to indicate that visibility into network events may be incomplete. For example, information may be missing corresponding to an active process, the state of a known connection, and/or missing information regarding network activity. In this manner, depending on conditions, a custom event can be transmitted to indicate what type of information is missing and what process may be responsible for that information, Health Data Processing Application In some embodiments, the health data processing application 100 may be operable to receive, from at least one collector application 200, network activity data corresponding to network activity of the applications on the network device on which the collector application 200 is installed. The health data processing application 100 may combine the network activity data received from the collector application 200 to remove redundant portions thereof. In some embodiments, the health data processing application 100 may archive the received activity data in a persistent data store along with a timestamp indicating when the activity data was collected and/or received. The health data processing application 100 may generate a model that includes identified network application components and their relatedness and/or links therebetween. The generated model may be displayed via one or more display devices such as, e.g., display devices 124a-124n discussed in greater detail above.

In some embodiments, the health data processing application 100 may be operable to combine network activity data reported from multiple collector applications 200 to eliminate redundancy and to address inconsistencies among data reported by different collector applications 200. For example, network data from multiple collector applications 200 may be stitched together to create a consistent view of the health of the network applications.

Some embodiments provide that the model may be a graphical display of the network including application components (machines, clients, processes, etc.) and the relationships therebetween. In some embodiments, the model may be generated as to reflect the real-time or near-real-time activity of the network. It is to be understood that, in this context, "near-real-time" may refer to activity occurring in the most recent of a specified time interval for which activity data was received. For instance, health data processing application 100 may receive from collector applications 200 aggregated activity data corresponding to the most recent 15-second interval of network operation, and, accordingly, the model of near-real-time activity may reflect the activity of the network as it existed during that most recent 15-second interval.

Some embodiments provide that the model may be generated to reflect an historical view of network activity data corresponding to a specified time interval. The historical view may be generated based on archived activity data retrieved from a persistent data store and having a timestamp indicating that the activity data was collected or received during the specified time interval. In other embodiments, the model may be dynamically updated to reflect new and/or lost network collectors and/or network components. Further, graphs may be provided at each and/or selected network resource indicators to show activity data over part of and/or all of the time interval.

In some embodiments, a model may include sparklines to provide quick access to trends of important metrics, process and application views to provide different levels of system detail, and/or model overlays to provide additional application analysis. For example, visual feedback regarding the contribution of a network link relative to a given criterion may be provided. In this manner, hop by hop transaction data about the health of applications can be provided. Additionally, visual ranking of connections based on that criteria may be provided. Bottleneck analysis based on estimated response times may be provided to identify slow machines, applications, and/or processes, among others.

Some embodiments provide that health data processing application 100 may be operable to infer the existence of network devices and/or network applications for which no activity data was received or on which no collector application 200 is running, based on the identification of other network devices and/or other network applications for which activity data was received. For instance, activity data received by health data processing application 100 may indicate that a network link has been established between a local network device running collector application 200 and a remote network device that is not running collector application 200. Because the activity data may include identifying information for both the local and remote network devices, health data processing application 100 may infer that the remote network device exists, and incorporate the remote network device into the generated model of network activity.

In other embodiments, health data processing application 100 may be operable to identify a network application based on predefined telecommunications standards, such as, e.g., the port numbers list maintained by the Internet Assigned Numbers Authority (IANA). Health data processing application 100 may, for example, receive activity data indicating that a process on a network device is bound to port 21. By cross-referencing the indicated port number with the IANA port numbers list, health data processing application 100 may identify the process as an File Transfer Protocol (FTP) server, and may include the identification in the generated model.

Figure 7:
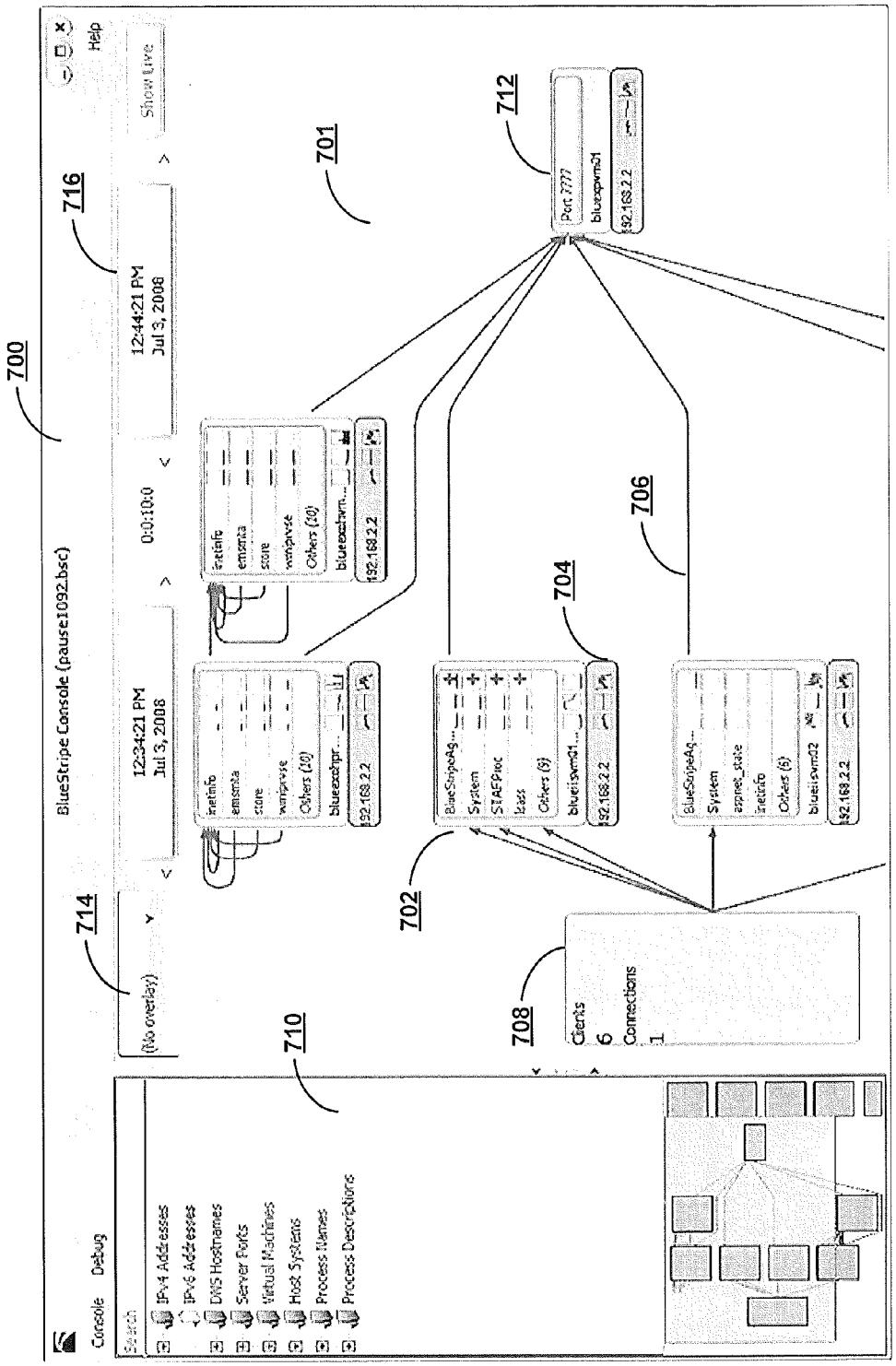
FIG. 7 is a screen shot of a graphical user interface (GUI) including a model generated by a health data processing application according to some embodiments of the present invention.

Reference is made to FIG. 7, which is a screen shot of a graphical user interface (GUI) including a model generated by a health data processing application according to some embodiments of the present invention. The GUI 700 includes a model portion 701 that illustrates representations of various network applications and/or application components 702. Such representations may include identifier fields 704 that are operable to identify application and/or application component addresses, ports, machines and/or networks. Connections 706 between network applications and/or application components may be operable to convey additional information via color, size and/or other graphical and/or text-based information. A summary field 708 may be provided to illustrate summary information corresponding to one or more applications and/or application components, among others. A port identification portion 712 may be operable to show the connections corresponding to and/or through a particular port. The GUI 700 may include a system and/or network navigation field 710, overlay selection field 714, and one or more time interval and/or snapshot field(s) 716.

Figure 8:
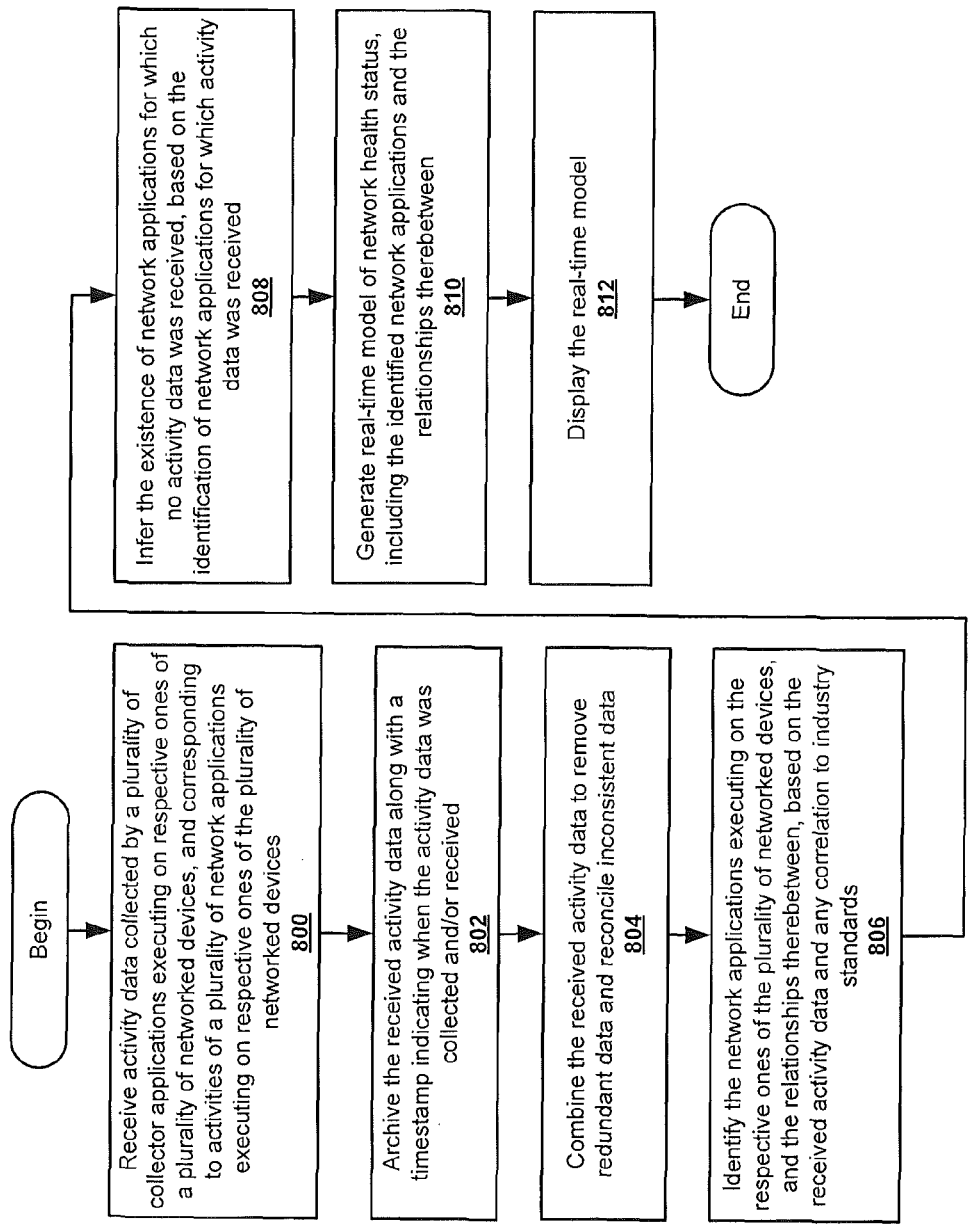
FIG. 8 is a flowchart illustrating example operations carried out by a health data processing application in generating and displaying a real-time model of network application health according to some embodiments of the present invention.

FIG. 8 is a flowchart illustrating example operations that may be carried out by health data processing application 100 in generating and displaying a real-time model of network application health according to some embodiments of the present invention. At block 800, health data processing application 100 may receive activity data from a plurality of collector applications 200 executing on respective ones of a plurality of network devices. The received activity data corresponds to activities of a plurality of network applications executing on respective ones of the plurality of networked devices. At block 802, the received activity data is archived along with a timestamp indicating when the activity data was collected and/or received. As discussed in greater detail with respect to FIG. 9, this archived data may allow health data processing application 100 to generate and display an historical model of network application health during a specified time interval. At block 804, the received activity data is combined to remove redundant data and to reconcile inconsistent data. At block 806, health data processing application 100 identifies the network applications executing on the respective ones of the plurality of networked devices, and ascertains the relationships therebetween. The identification of the network applications and the relationships therebetween may be based on the received activity data, and may further be determined based on a correlation between the received activity data and predefined industry standards, as discussed above. At block 808, health data processing application 100 may infer the existence of network applications for which no activity data was received, based on the identification of network applications for which activity data was received. At block 810, a real-time model of network health status, including the identified network applications and the relationships therebetween, is generated, and the model is displayed at block 812.

Figure 9:
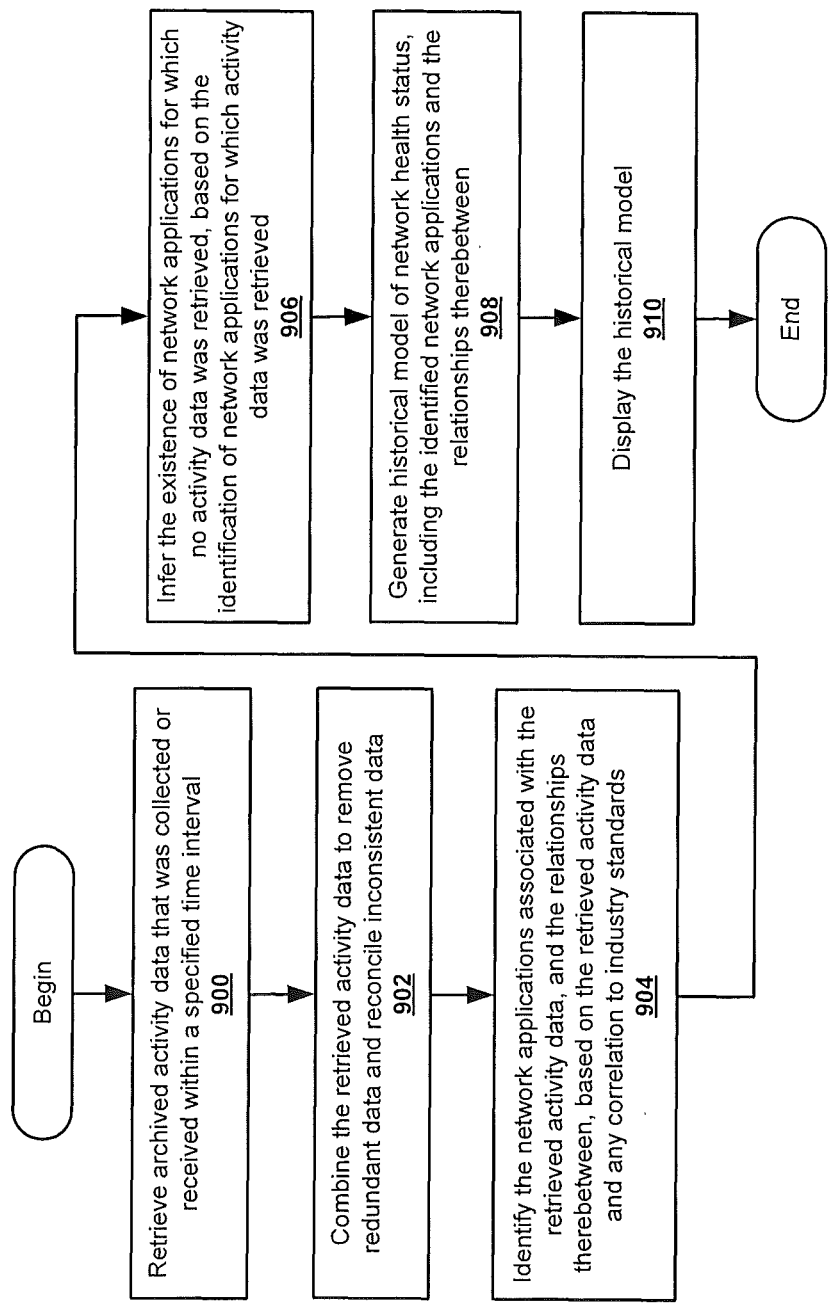
FIG. 9 is a flowchart illustrating example operations carried out by a health data processing application in generating and displaying an historical model of network application health according to some embodiments of the present invention.

FIG. 9 is a flowchart illustrating example operations carried out by a health data processing application 100 in generating and displaying an historical model of network application health according to some embodiments of the present invention. At block 900, the activity data previously archived at block 802 and corresponding to a specified time interval is retrieved. The retrieved activity data is combined to remove redundant data and reconcile inconsistent data at block 902. At block 904, health data processing application 100 identifies the network applications associated with the retrieved activity data, and ascertains the relationships therebetween. The identification of the network applications and the relationships therebetween may be based on the retrieved activity data, and may further be determined based on correlation between the retrieved activity data and industry standards. At block 906, health data processing application 100 may infer the existence of network applications for which no activity data was retrieved, based on the identification of network applications for which activity data was retrieved. At block 908, an historical model of network health status in the specified time interval, including the identified network applications and the relationships therebetween, is generated, and the historical model is displayed at block 910.

Custom Protocol

Some embodiments provide that transferring the activity data between the collector applications 200 and the health data processing application 100 may be performed using a compact, self-describing, linear buffer communications protocol. In some embodiments, the custom protocol uses a common representation for monitoring information, commands and configuration data. As the methods and systems described herein are intended to monitor network performance, the protocol may be operable to minimize the volume of information exchanged between the collector applications 200 and the health data processing application 100.

In some embodiments, the collector applications 200 are operable to generate events in a streaming data format. Events may be generated corresponding to the predefined monitoring time period. Information provided corresponding to an event may include an event type, network resource identification data including PID, remote identifiers, quantities and/or types of data sent/received, and/or response time information, among others. The protocol may include a banner portion that may be established through a handshaking process that may occur when a collector application 200 initially communicates with the health data processing application 100. The banner portion may define the data types and formats to be transferred. In this manner, the protocol may be flexible by virtue of the self-descriptive banner portion and may avoid sending unused, unwanted or blank data fields.

Monitoring the Contents of Network Traffic in a Network Device

As discussed above, collector application 200 may collect raw data related to the occurrence and attributes of transactions between network applications (i.e., "performance data"), which may have value for diagnosing network application performance issues and/or for identifying and understanding the structure of the network applications. Collector application 200 may also generate events that provide measurements or aggregations of performance data (i.e., "metrics" or "performance metrics"). However, some performance issues, particularly those that occur sporadically, or those for which identifying and/or recreating the circumstances leading to the performance issues is difficult, may be challenging to diagnose using performance data and metrics. In such scenarios, identification and analysis of transaction data that is communicated between network applications and that is contained within the raw network traffic data may provide diagnostic value.

Figure 10:
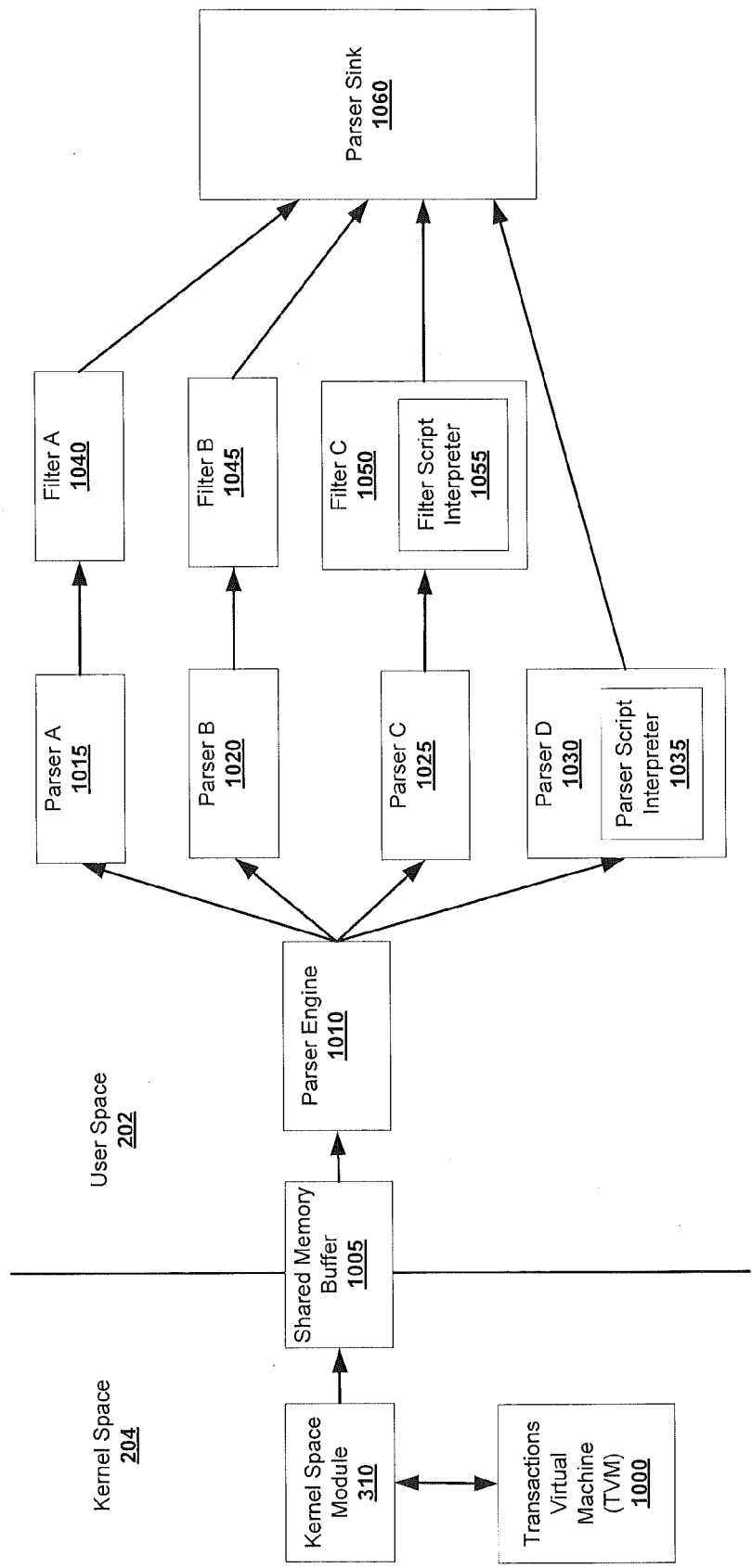
FIG. 10 is a block diagram illustrating the architecture of a system providing network traffic data parsing and filtering according to some embodiments of the present invention.

In some embodiments, therefore, collector application 200 may provide a method for parsing and optionally filtering network traffic data to identify and extract transaction data contained therein. FIG. 10 illustrates the architecture of an example system providing network traffic data parsing and filtering according to some embodiments of the present invention. As detailed above with respect to FIG. 3, kernel space module 310 in kernel space 204 is operative to intercept packets of network traffic data, in substantially real-time, as the data is sent by a network device and/or received by a network device. In this context, "substantially real-time" means that network traffic data is collected immediately subsequent to the sending and/or receiving of the network traffic data, subject to the delays inherent in the operation of the computing device and/or the network and in the method of collection.

Kernel space module 310 is communicatively coupled to transactions virtual machine (TVM) 1000, which may be consulted by kernel space module 310 with respect to each packet of network traffic data to determine whether the packet should be collected and sent for parsing. In some embodiments, TVM 1000 may provide a compact and efficient bytecode representation of a criteria predicate expression (for example, a Boolean combination of individual predicates) that defines the characteristics of network traffic data to be collected. For instance, a criteria predicate may dictate that only network traffic data arriving on a particular network port, network traffic data sent from a particular remote IP address, and/or network traffic data sent or received by a particular application is to be collected. In this way, TVM 1000 may effectively describe "interesting" network traffic data that is to be collected.

Network traffic data deemed "interesting" by TVM 1000 is collected by kernel space module 310 and sent to shared memory buffer 1005. Shared memory buffer 1005 is an area of memory that accessible by both kernel space module 310 executing in kernel space 204 and other modules of collector application 200 executing in user space 202. By using shared memory buffer 1005, kernel space module 310 in some embodiments may incur few or no context switches in transferring the collected network traffic data, thus allowing large amounts of data to be transferred to collector application 200 efficiently and asynchronously. Some embodiments may provide that the size of shared memory buffer 1005 may be configurable by, for instance, a configuration file. In some embodiments, the size of shared memory buffer 1005 may be adaptive based on available memory. For example, if a surplus of memory becomes available, the size of shared memory buffer 1005 may be automatically increased, whereas if the amount of available memory is reduced, the size of shared memory buffer 1005 may be automatically decreased.

Parser engine 1010 of collector application 200 executing in user space 202 retrieves collected network traffic data from shared memory buffer 1005 and determines how the collected network traffic data will be further processed. In some embodiments, parser engine 1010 may pass the collected network traffic data into one or more protocol-specific parsers for processing, depending on the network protocol of the collected network traffic data. For example, protocol-specific parsers 1015, 1020, 1025, and 1030 may be associated with the Oracle Structured Query Language (SQL), Microsoft SQL (MS-SQL), Message Queue (MQ), and LDAP network protocols, respectively. Thus, if the collected network traffic data is associated with the Oracle SQL query protocol, then the collected network traffic data may be passed to Parser A 1015 for processing. Likewise, collected network traffic data associated with a MS-SQL query may be passed to Parser B 1020, collected network traffic data associated with a MQ query may be forwarded to Parser C 1025, and collected network traffic data associated with an LDAP query may be sent to Parser D 1030. The protocol-specific parsers 1015, 1020, 1025, and 1030 may extract transaction data related to logical transactions defined by the respective network protocols. It is to be understood that the network protocol processed by an example protocol-specific parser may be any network protocol for which network traffic data may be collected, and is not limited to the network protocols enumerated above. It is to be further understood that parser engine 1010 may forward the same collected network traffic data to multiple protocol-specific parsers, or to no parser.

The transaction data related to logical transactions and extracted by a protocol-specific parser may include diagnostically useful associated metadata. In some embodiments, the associated metadata may include, for example, server response time, the size in bytes of the request and/or the response, an error code (if a transaction was unsuccessful), a timestamp associated with the request, the IP address of the client and/or the server, the server port, and/or the server process ID, among others. The associated metadata may also include protocol-specific metadata extensions, including user name, database name, and/or session ID, among others.

In some embodiments, protocol-specific parsers include shared libraries, each implementing a well-defined parser Application Programming Interface (API), and each loaded at run time by collector application 200 according to the contents of a configuration file. Each protocol-specific parser, in some embodiments, may have access to the configuration and logging facilities of collector application 200.

Some embodiments may provide a protocol-specific parser that implements the parser API, and that further incorporates an embedded script interpreter that is operable to execute a script that defines parsing operations. For example, Parser D 1030 may include a module implementing the parser API, and may have embedded within it parser script interpreter 1035, which interprets a script to determine how collected network traffic data passed to Parser D 1030 will be parsed. Parser script interpreter 1035 may be operable to interpret scripting languages such as Perl, PHP, JavaScript, Ruby, Python, and/or Tcl, among others. The use of an interpreted script to define parsing operations may allow for the quick prototyping of protocol-specific parsers, as well as providing a simplified means for support personnel and users to implement protocol-specific parsers. Protocol-specific parsers using embedded script interpreters may also provide platform independence, and may permit parser developers to take advantage of the inherent capabilities of the particular scripting language used.

Each protocol-specific parser 1015, 1020, 1025, and 1030 may "consume" more or less data than is made available to it by parser engine 1010. In this context, "consume" means to indicate that a specified quantity of data has been processed. For example, a protocol-specific parser may examine the collected network traffic data, and may be able to determine based on the collected network traffic data that a subsequent portion of network traffic data is likely to be unimportant or irrelevant. The collected network traffic data, for instance, may contain a transaction identifier, from which the protocol-specific parser may determine that the subsequent portion of network traffic data contains only padding or other data of no interest. Accordingly, the protocol-specific parser may indicate that the collected network traffic data and the subsequent portion of network traffic data has been consumed (i.e., that the protocol-specific parser has consumed more data than was actually made available to it by parser engine 1010). Conversely, the protocol-specific parser may determine that part of the available collected network traffic data is not sufficient to extract a complete transaction, or that the available collected network traffic data is insufficient to extract even a single logical transaction. In this case, the protocol-specific parser may indicate that only some, or none, of the collected network traffic data was consumed (i.e., that the protocol-specific parser has consumed less data than is available). In some embodiments, this may allow the collected network traffic data to be buffered until sufficient data has accumulated to permit the extraction of one or more complete logical transactions by the protocol-specific parser. A protocol-specific parser, in some embodiments, may determine that the network traffic data collected from a particular network flow cannot be parsed at all, and, in response, will indicate that subsequent network traffic data corresponding to the same network flow is not to be parsed.

After a protocol-specific parser has extracted transaction data corresponding to at least one logical transaction from the collected network traffic data, it may pass the extracted transaction data directly to parser sink 1060, as, for example, with Parser D 1030 in FIG. 10. In some embodiments, a protocol-specific parser may forward the extracted transaction data to a filter for further processing. For example, parsers 1015, 1020, and 1025 may pass extracted transaction data to filters 1040, 1045, and 1050, respectively. It is to be understood that there may be any number of filter stages following a protocol-specific parser—i.e., the output generated by one filter may be passed to another filter in a linear fashion, thus creating a "pipeline" sequence of parsing and filtering modules. It is to be further understood that a filter may receive input from more than one protocol-specific parser.

Each filter may alter the transaction data passed into it by modifying and/or deleting parts of the data, or by supplementing the transaction data with additional data. For instance, filters 1040 and 1045, which may receive SQL transaction data extracted by parsers 1015 and 1020, respectively, may be operable to normalize SQL transaction data by removing string and numeric literals and extraneous whitespace, and by capitalizing keywords within the SQL transaction data passed into the filters. In some embodiments, a filter may identify and aggregate related logical transactions, and may represent the aggregated logical transactions as a single filtered transaction. For example, a filter may create and output a logical transaction representing the combination of all Uniform Resource Locator (URL) transactions from a single client corresponding to retrieval of one complete web page.

As with protocol-specific parsers, filters, in some embodiments, may incorporate an embedded script interpreter that is operable to execute a script that defines filtering operations. For example, Filter C 1050 has embedded within it filter script interpreter 1055, which interprets a script to determine how extracted transaction data passed to Filter C 1050 will be filtered. Filter script interpreter 1055 may be operable to interpret scripting languages such as Perl, PHP, JavaScript, Ruby, Python, and/or Tcl, among others.

Filters 1040, 1045, and 1050 and protocol-specific parser 1030 pass their respective outputs to parser sink 1060 of collector application 200. Parser sink 1060 may aggregate the transaction data that was extracted and/or filtered within a predefined time interval, and may then generate an event based on the aggregated transaction data. In some embodiments, health data processing application 100 may receive events from collector application 200, and may request that collector application 200 data send transaction data in "trace mode." In trace mode, parser sink 1060 may aggregate the transaction data, as above, and also may compress the entirety of the transaction data and generate an event based on the compressed transaction data. This may provide health data processing application 100 with more detailed transaction data for use in diagnosing network and/or application performance issues.

Figure 11:
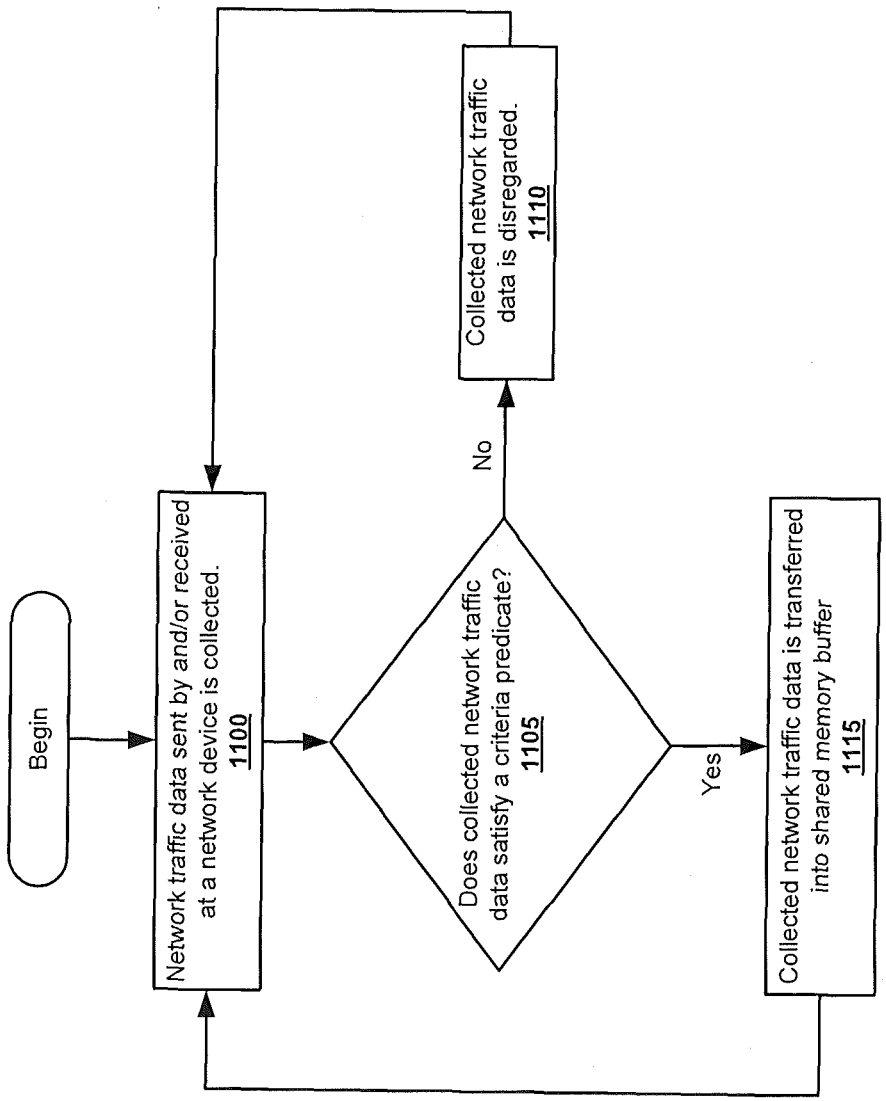
FIG. 11 is a flowchart illustrating example operations carried out by a collector application in collecting raw network traffic data that is sent to and/or received by a network device according to some embodiments of the present invention.

Reference is now made to FIG. 11, which illustrates example operations carried out by a kernel space module of collector application 200 in collecting raw network traffic data to be parsed and/or filtered. At block 1100, kernel space module 310, using a kernel space driver interface, collects network traffic data sent by and/or received at a network device. Kernel space module 310 determines whether the collected network traffic satisfies a criteria predicate, which may specify the characteristics of the network traffic data for which parsing and/or filtering is to be carried out (block 1105). In some embodiments, for example, the criteria predicate may specify that only network traffic data that arrives on a particular port, network traffic data that was sent from a particular remote IP address, and/or network traffic data that was sent or received by a particular program is to be parsed and/or filtered. If the collected network traffic data does not satisfy the criteria predicate, the collected network traffic data is disregarded (block 1110), and kernel space module 310 resumes operation again at block 1100. If the collected network traffic data does satisfy the criteria predicate, then kernel space module 310 transfers the collected network traffic data into a shared memory buffer 1005 (block 1115). As detailed above with respect to FIG. 10, shared memory buffer 1005 is an area of memory that is shared between and accessible by both kernel space module 310 executing in kernel space 1000 and other modules of collector application 200 executing in user space 1005. After the collected network traffic data is transferred to shared memory buffer 1005, the kernel space module 310 resumes operation at block 1100.

Figure 12:
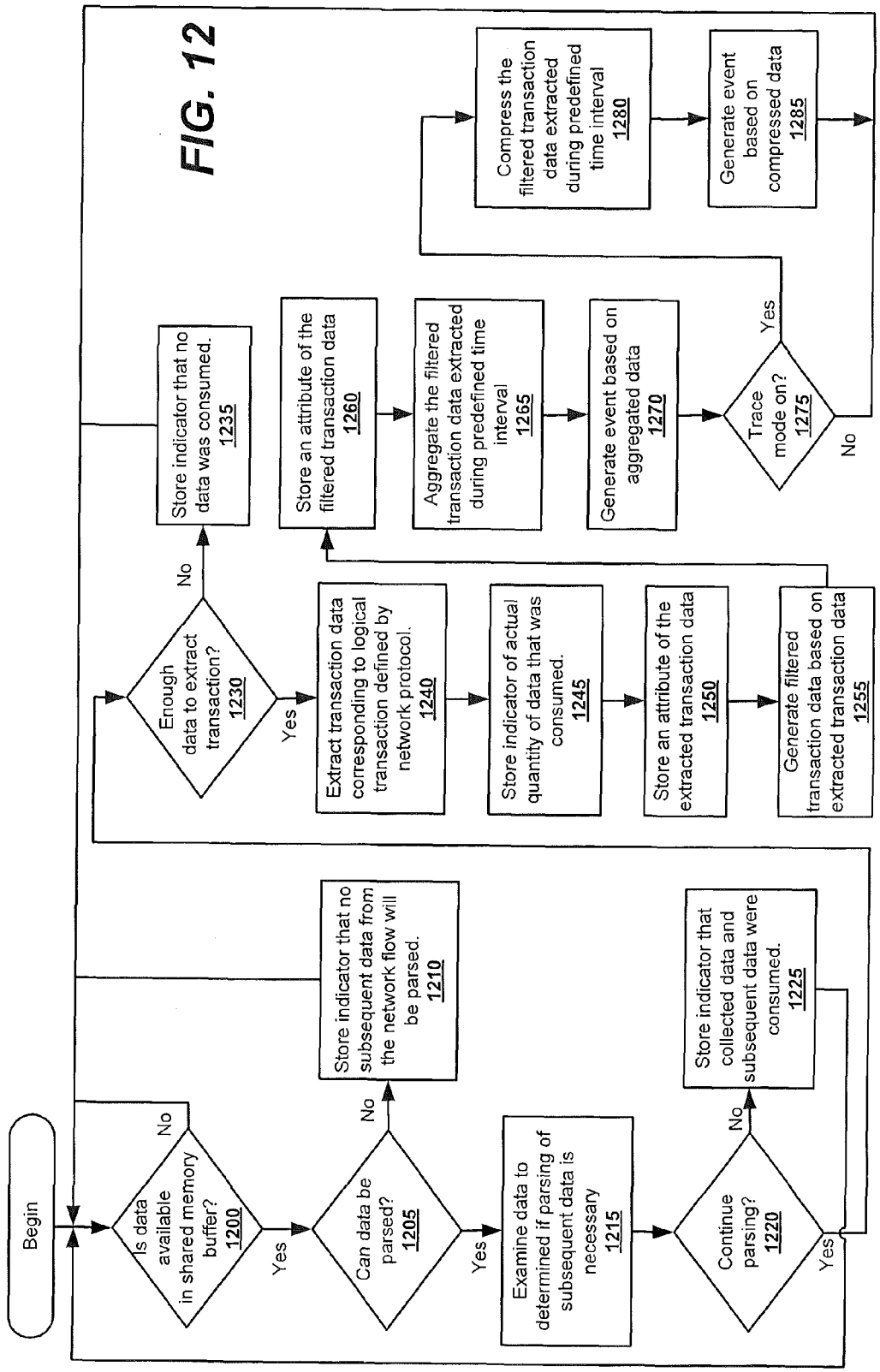
FIG. 12 is a flowchart illustrating example operations carried out by a collector application in parsing and filtering collected network traffic data according to some embodiments of the present invention.

FIG. 12 illustrates example operations carried out by collector application 200 in parsing and/or filtering the collected network traffic data. At block 1200, collector application 200 determines whether any collected network traffic data is available to be processed in shared memory buffer 1005. If there is no collected network traffic data to be processed, then operation resumes at block 1200. If shared memory buffer 1005 contains collected network traffic data, collector application 200 uses an appropriate protocol-specific parser to examine the collected network traffic data and determine whether the data can be parsed (block 1205). If the data cannot be parsed—such as, for example, the collected network traffic data is in a format not recognized by the protocol-specific parser, or is otherwise incomprehensible—then collector application 200 stores an indicator signifying that no subsequent network traffic data from the corresponding network source will be parsed (block 1210), and operation resumes at block 1200.

If the data can be parsed, the protocol-specific parser examines the collected network traffic data to determine whether parsing of subsequent network traffic data is necessary (blocks 1215 and 1220). For example, the collected network traffic data may contain a transaction identity indicating that a subsequent portion of network traffic data contains only padding or other data of no interest. If further parsing is unnecessary, the protocol-specific parser stores an indicator indicating that both the collected network traffic data and the subsequent portion of network traffic data were consumed, and operation resumes at block 1200.

If further parsing is necessary, then the protocol-specific parser examines whether the collected network traffic data is sufficient to allow the extraction of at least one logical transaction (block 1230). If there is not enough collected network traffic data to extract at least one logical transaction (as may be the case, for instance, where the collected network traffic data comprises a single IP packet, but a logical transaction spans multiple IP packets), then the protocol-specific parser stores an indicator indicating that none of the collected network traffic data was consumed (block 1235). In some embodiments, this permits the collected network traffic data to be buffered until sufficient data has been collected to enable the extraction of at least one logical transaction. Operation then resumes at block 1200.

If sufficient network traffic data has been collected, then the protocol-specific parser extracts transaction data corresponding to at least one logical transaction that is defined by a network protocol from the collected network traffic data (block 1240). For example, depending on the network protocol associated with the collected network traffic data, transaction data may include URL of a requested web page or the contents of a SQL, LDAP, and/or MQ query, among others. At block 1245, the protocol-specific parser stores an indicator indicating the actual quantity of data that was consumed. An attribute of the extracted transaction data is stored in memory and/or in a persistent data store (block 1250). In some embodiments, this may allow the protocol-specific parser to maintain state information regarding the logical transactions for which data is extracted from the collected network traffic data.

At block 1255, a filter generates filtered transaction data based on the extracted transaction data passed to it from the protocol-specific parser. As detailed above with respect to FIG. 10, a filter may modify and/or delete data in the extracted transaction data, and/or may supplement the extracted transaction data with additional data. An attribute of the filtered transaction data is stored in memory and/or in a persistent data store (block 1260). In some embodiments, this may allow the filter to maintain state information regarding the logical transactions represented by the filtered transaction data.

Collector application 200 aggregates the filtered transaction data that was extracted during a predefined time interval (block 1265) and generates an event based on the aggregated data (block 1270). Collector application 200 then determines whether a trace mode has been requested by health data processing application 100 (block 1275). If so, then the entire contents of the filtered transaction data that was extracted during a predefined time interval is compressed (block 1280), and an additional event is generated by collector application 200 based on the compressed data (block 1285). Operation then resumes at block 1200.

Identification of Transactional Traffic

As described above, the collector application and/or module 200 generates performance data or metrics related to and/or indicative of the health of the network. The health data processing application and/or module 100 may be operable to receive metric data from multiple collectors 200, as illustrated in FIG. 1a. Large numbers of metrics about a distributed application may be collected, including user-visible performance metrics such as transactions per second and latency of transactions as well as infrastructure metrics relating to CPU, memory, and disk load. To understand the health of an application, users presented with these numerous metrics may desire to classify network traffic types, such as transactional traffic and/or non-transactional traffic. Additionally, metrics relevant to the health of the application may be identified. As such, it may be advantageous to filter network traffic that includes a mixture of transactional and non-transactional traffic.

Figure 13:
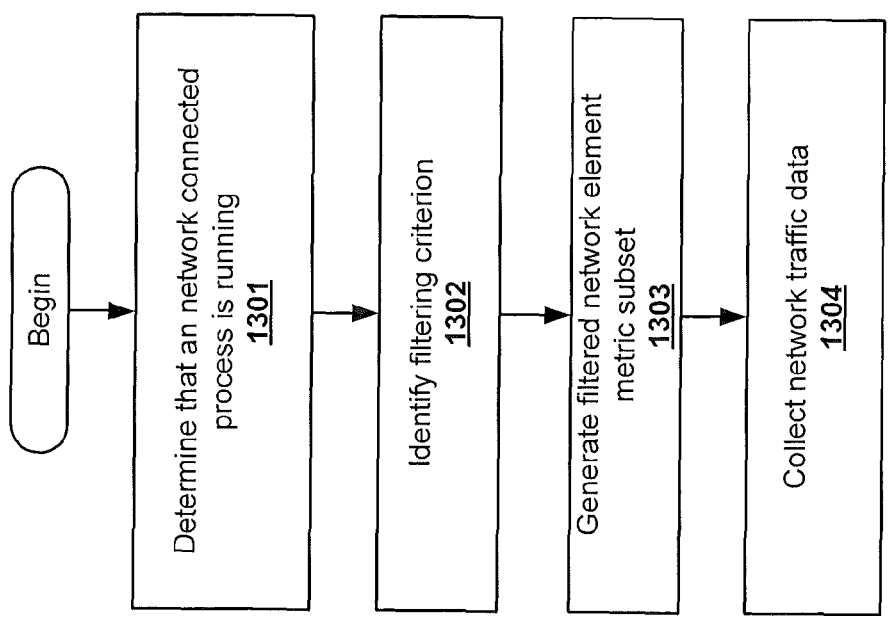
FIG. 13 is a flowchart illustrating example operations carried out for collecting network traffic data according to some embodiments of the present invention.

Reference is made to FIG. 13, which is a flowchart illustrating example operations carried out for collecting network traffic data according to some embodiments of the present invention. Monitored network elements may include processes that communicate using a network such as, for example, application servers. An application server may include a genre of enterprise software known as application and integration middleware. These software products may be used by end-users to create applications and/or integrate applications with other applications.

A collector may determine the presence of a network connected process that is running, as shown in block 1301 of FIG. 13. The network connected process may be a process that sends and/or receives data to and/or from a network. In some embodiments, the network connected process may be related to an application server. The application server may be a Java 2 Enterprise application server such as, for example, IBM Web Sphere. Other example application servers may include Oracle WebLogic Server, JBoss Application Server, Apache Tomcat, Apache TomEE, Caucho Resin, or SQL servers, among others. In some example embodiments, a collector may determine the presence of a java process that is associated with the WebSphere Application Server.

As illustrated in block 1302, once the collector determines that a network connected process is running, one or more filtering criteria that correspond to a network traffic type may be identified based on configuration information. Network traffic type may include transactional traffic and/or non-transactional traffic. For example, a server may bind two ports and use one port for transactional traffic such as HTTP traffic and may use another port for non-transactional, administrative or configuration traffic. Identifying filtering criterion to distinguish traffic types may include identifying ports or protocols and will be described in greater detail below.

In some embodiments, the collector may trigger a custom plug-in or another process to execute and gather detailed configuration information about the network connected process. The custom plug-in may communicate information to the collector regarding the command line, working directory, and/or system-wide process identifier of the running network connected process, among others. In some embodiments, the plug-in may determine the location of a file that includes configuration information specific to the application server. For example, the plug-in may determine the location of a file called "serverindex.xml" that indicates configuration information that is specific to the WebSphere instance. The plug-in may open a configuration data file and/or database and parse the data to determine filtering criterion. For example, the plug-in may open the file "serverindex.xml" and parse the XML code to determine TCP ports that are used for transactional traffic. These TCP ports used for transactional traffic may be included in the filtering criterion. In some example embodiments, XML elements with an "endPointName" of "WC_defaulthost", "WC_defaulthost_secure", "PROXY_HTTP_ADDRESS", or "PROXY_HTTPS_ADDRESS", among others, may be considered as transactional ports and added to the filtering criterion. The plug-in may communicate the filtering criterion, such as the transactional ports, to the collector. The collector may communicate the filtering criterion for each network connected process to the health data processing application.

As illustrated in block 1303, a filtered network element metric subset may be generated based on the filtering criterion. The filtered network element metric subset may be a portion of the collected metrics. In some embodiments, based on the filtering criterion that may be determined as previously described, a subset of filtered network element metrics may be established. In some embodiments the filtered network element metric subset may also be referred to as "network activity metric." The filtered network element metric subset may include network element metrics associated with a network element, link, port, and/or protocol, among others. For example, the health data processing application may receive an indication from a collector with transactional port numbers for each network connected process running the WebSphere Application Server. This information may be stored by the health data processing application in an internal model representing the network connected process.

As illustrated in block 1304, network traffic data associated with the filtered network element metric subset may be collected. The amount of collected network traffic data may be substantially reduced, according to some embodiments, since traffic associated with the filtered network element metric subset, which may be a subset of the overall network element metrics, is collected. Furthermore, in some embodiments, if the network connected process is the root process of an application, or an entry point of an application, the health data processing application may determine the health of the root application by analyzing the received traffic data based on the filtering criterion.

Figure 14:
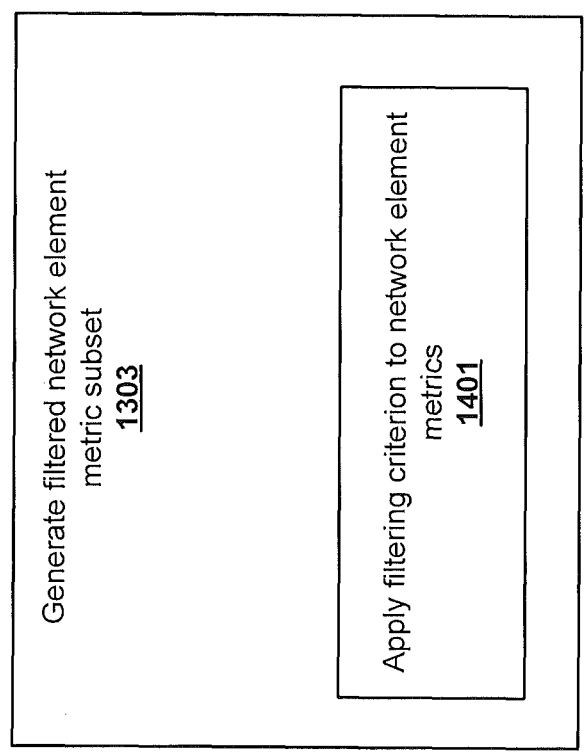
FIG. 14 is a block diagram illustrating operations for generating a filtered network element metric subset by applying filtering criterion according to some embodiments of the present invention.

Reference is made to FIG. 14, which is a block diagram illustrating operations for generating a filtered network element metric subset by applying filtering criterion according to some embodiments of the present invention. As previously described regarding block 1303, based on the filtering criterion, a filtered subset of network element metrics may be generated. According to block 1401, this filtered network element metric subset may be determined by selectively applying the filtering criterion to the network element metrics in the system. For example, the health data processing application may include dependencies of the network connected process with TCP links through ports that were deemed transactional in nature. In other words, the filtered network element metric subset for this scenario may be limited to certain TCP links through ports that were part of the filtering criterion.

In some embodiments, display rules including a list of ports that are transactional may be designated either by operator indication or by rules based on the type of network connected process. Display rules may include configuration primitives for controlling interpretation of data sent by the collectors. The ports included in the display rules may be used as part of the filtering criterion. Ports in a display rule may be identified as being transactional ports. In other embodiments, display rules may include a list of ports that are non-transactional. In this case, ports not in the display rules may be characterized as being transactional ports and traffic may be filtered as such.

Figure 15:
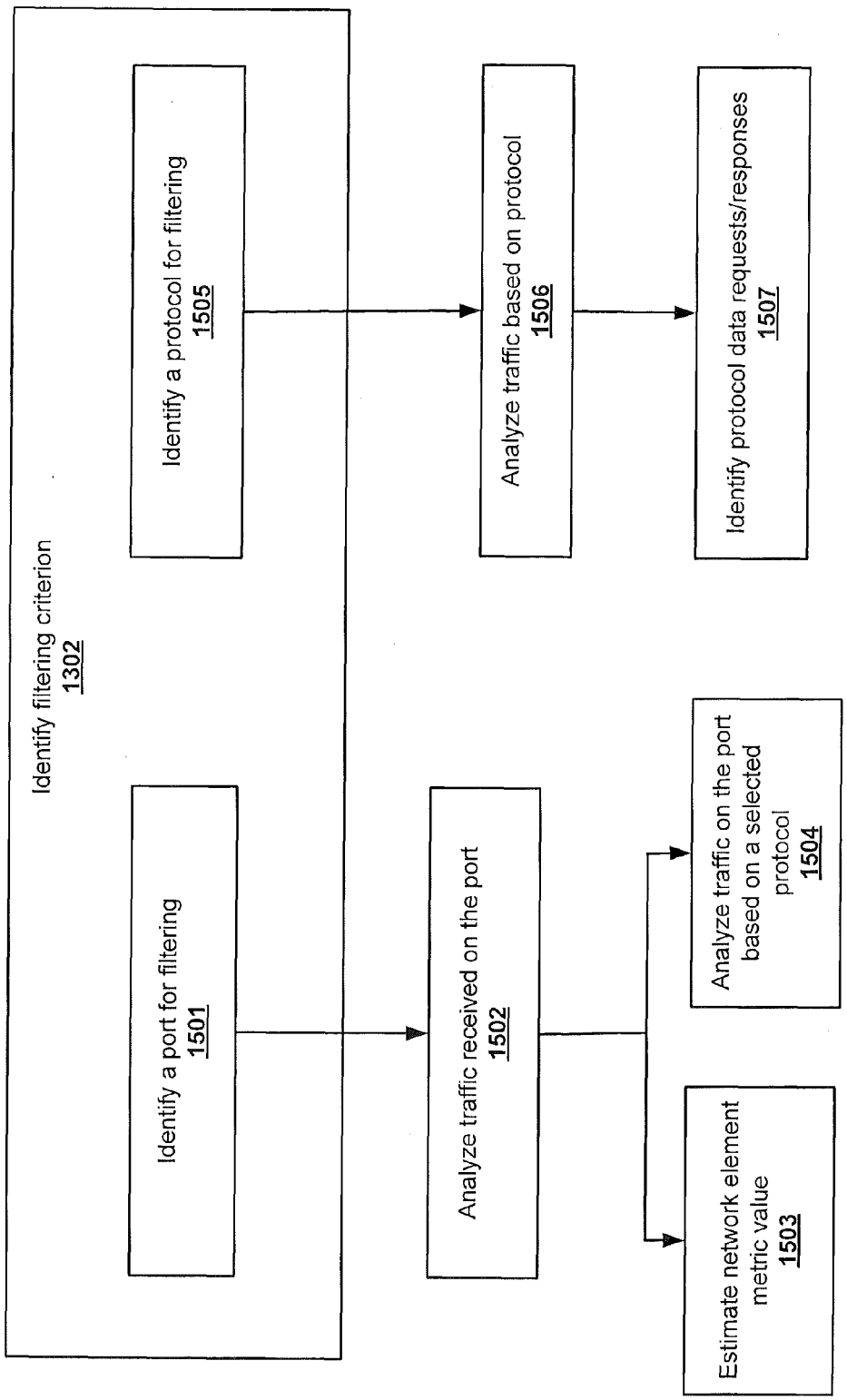
FIG. 15 is a flowchart illustrating identifying filtering criterion and analyzing traffic based on the filtering criterion according to some embodiments of the present invention.

Reference is made to FIG. 15, which is a flowchart illustrating identifying filtering criterion and analyzing traffic based on the filtering criterion according to some embodiments of the present invention. As previously described regarding block 1302, a filtering criterion may be identified based on configuration information. Examples of generating filtering criterion may include identifying a port for filtering, as in block 1501, and/or identifying a protocol on which to base filtering, as in block 1505. In some embodiments, a port used by the network connected process may be identified. In some embodiments, this port may correspond to a network traffic type. The port may be identified, for example, by a TCP port number or a UDP port number, among others. Traffic that is received on this port may then be identified, collected and/or analyzed (block 1502). In some embodiments, generating filtering criterion may include identifying an IP address for filtering.

As illustrated in block 1503, analyzing traffic may include estimating at least one network element metric value corresponding to traffic received on the port. The network element metric value may include performance data, time delay, wait time, number of stall cycles, read time, write time, number of read operations, total bytes sent, total bytes received, total response time, the number of responses from the server, percentage of CPU time, aggregate memory percentage, bytes sent/received on network interfaces, page faults, number of pages input, number of pages output, and/or queue length, among others.

According to some embodiments, traffic on an identified port may be further filtered based on a selected protocol (block 1504). In such embodiments, the filtering criterion may include both port numbers and protocols, in which case traffic utilizing the specified protocol and port number will be analyzed. The actual filtering based on a combination of port number and protocol may occur in any order. Some traffic on a particular port may be considered transactional while other traffic is not. In these cases, protocol parsers may inspect the traffic in further detail to determine which requests and/or responses are transactional and/or non-transactional.

According to some embodiments, filter criterion may include identifying a protocol for filtering (block 1505). Traffic may be analyzed based on the protocol (block 1506). Example protocols may include HTTP, HTML, X.25, ICMP, POP3, IMAP, TCP, UDP, IP, TCP/IP, SIP, IGMP, SNMP, SMTP, FTP, TFTP, SFTP, RMI, and/or SOAP, among others. The collector may determine the protocol of the traffic flowing in or out of a process, for example, by using collector-side protocol parsers. The determination of the protocol may determine the network traffic type. For example, by determining the protocol of the traffic to be HTTP, the traffic may be classified as being transactional. Further granularity to traffic analysis may be obtained by identifying protocol data requests and/or responses to data requests, as shown in block 1507. Separating data requests and responses within a protocol may provide further filtering of the traffic for analysis. For example, DNS requests may be treated with special attention during analysis.

Figure 16:
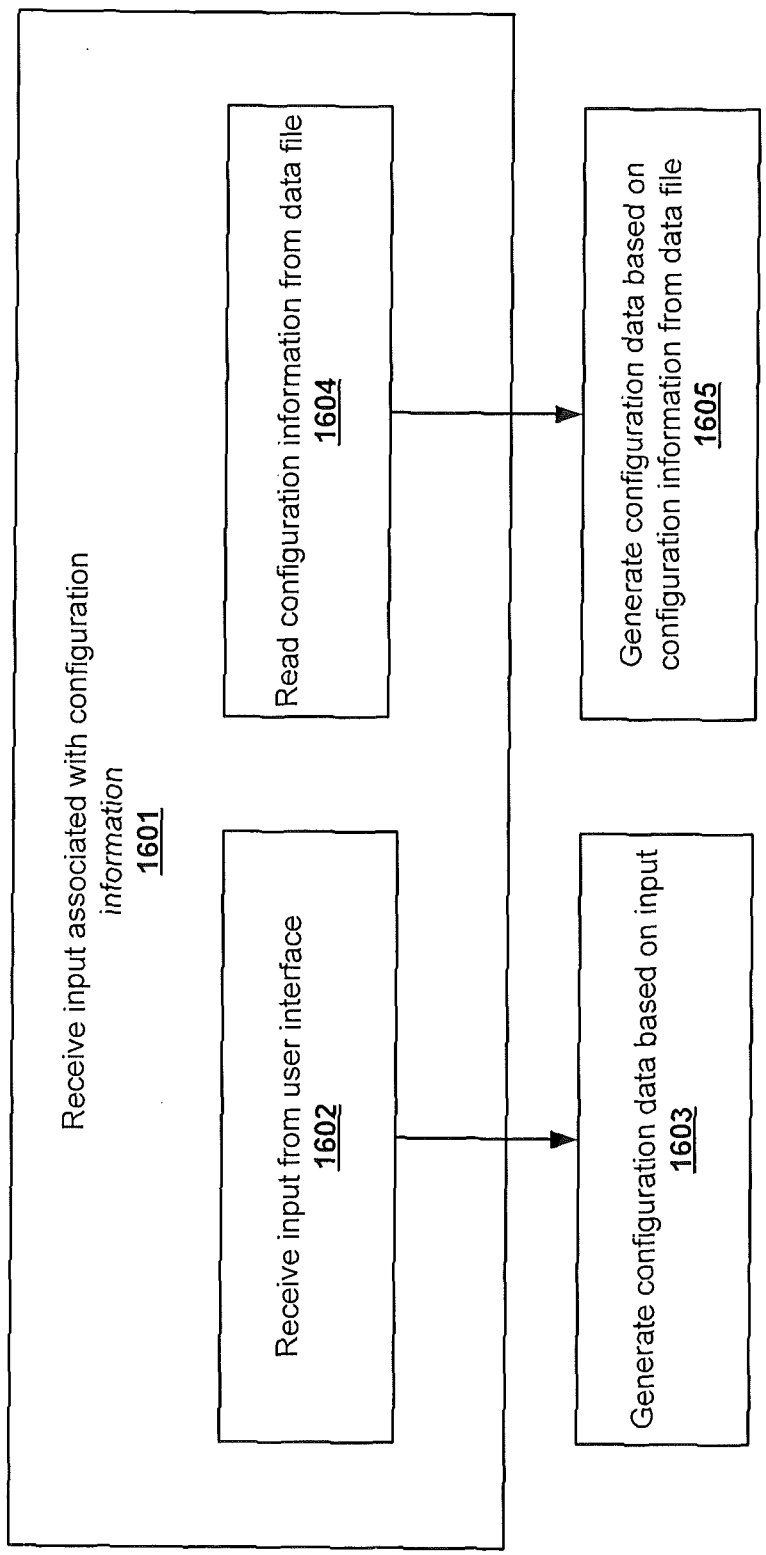
FIG. 16 is a flowchart illustrating example operations for receiving input associated with configuration information according to some embodiments of the present invention.

Reference is made to FIG. 16, which is a flowchart illustrating examples of receiving input associated with configuration information according to some embodiments of the present invention. As illustrated in block 1601, input associated with configuration information related to the network connected process may be received. According to some embodiments, input may be received from a user interface (block 1602). Input received from a user interface may include text and/or graphical input. The received input may include information related to a port number and/or a protocol. In some embodiments, the received input may include information from which a port number and/or a protocol may be generated. The user input may trigger updating of the configuration data. In some embodiments, the user input may be applied at configuration time intervals during which filtering criterion may be updated. Configuration data based on the received input may be generated (block 1603). Configuration data may include a port number, a protocol, and/or other information which may be used to determine display rules and/or filtering criterion.

In some embodiments, a data file with configuration information may be read (block 1604). The data file may include information related to a port number and/or a protocol. In some embodiments, the data file may include information from which a port number and/or a protocol may be generated. The data file may comprise configuration information that may be parsed or otherwise analyzed to generate configuration data (block 1605). The data file may be read initially, but may also be read at regular intervals to update the filtering criterion based on changes to network topology or other application and/or network changes. Additionally, in situations of dynamic updates to the configuration data, updating of the filtering criterion may also occur.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the following claims.

That which is claimed:

1. A method of analyzing network traffic comprising:
   determining a network connected process that is running, wherein the network connected process is associated with network element metrics;
   receiving input associated with configuration information related to the network connected process;
   identifying, based on the configuration information, a filtering criterion that corresponds to a network traffic type;
   filtering the network element metrics based on the filtering criterion to establish a filtered network element metric subset; and
   collecting network traffic data associated with the filtered network element metric subset, thereby reducing the network traffic data being collected to a subset of total network traffic data, and
   wherein at least one of determining that the network connected process is running, identifying the filtering criterion, generating the filtered network element metric subset, and collecting the network traffic data is performed using at least one processor.

2. The method of analyzing network traffic of claim 1, wherein filtering the network element metrics comprises applying the filtering criterion to network element metrics associated with the network connected process.

3. The method of analyzing network traffic of claim 1, wherein the network connected process that is running is running on a Java application server.

4. The method of analyzing network traffic of claim 1, wherein the network traffic type includes transactional traffic.

5. The method of analyzing network traffic of claim 1, wherein the network traffic type includes non-transactional traffic.

6. The method of analyzing network traffic of claim 1, wherein identifying the filtering criterion that corresponds to the network traffic type comprises identifying a port used by the network connected process.

7. The method of analyzing network traffic of claim 6, wherein identifying the port used by the network connected process comprises identifying a TCP port number.

8. The method of analyzing network traffic of claim 6, wherein identifying the port used by the network connected process comprises identifying a UDP port number.

9. The method of analyzing network traffic of claim 1, wherein identifying the filtering criterion that corresponds to the network traffic type comprises identifying an IP address used by the network connected process.

10. The method of analyzing network traffic of claim 6, wherein collecting network traffic data associated with the filtered network element metric subset comprises analyzing traffic received on the port.

11. The method of analyzing network traffic of claim 10, wherein analyzing traffic received on the port comprises estimating at least one network element metric value corresponding to the traffic received on the port.

12. The method of analyzing network traffic of claim 11, wherein the network element metric value includes one of performance data, time delay, wait time, number of stall cycles, read time, write time, number of read operations, total bytes sent, total bytes received, total response time, the number of responses from the server, percentage of CPU time, aggregate memory percentage, bytes sent/received on network interfaces, page faults, number of pages input, number of pages output, and/or queue length.

13. The method of analyzing network traffic of claim 10, wherein collecting network traffic data associated with the filtered network element metric subset further comprises analyzing traffic on the port based on a selected protocol.

14. The method of analyzing network traffic of claim 1, wherein receiving input associated with configuration information related to the network connected process comprises:
   receiving an input from a user via a user input interface; and
   generating configuration data based on the input from the user.

15. The method of analyzing network traffic of claim 1, wherein receiving input associated with the configuration information related to the network connected process comprises:
   reading a data file that includes the configuration information; and
   generating configuration data based on the configuration information from the data file.

16. The method of analyzing network traffic of claim 1, wherein collecting the network traffic data associated with the filtered network element metric subset comprises analyzing network traffic based on a protocol.

17. The method of analyzing network traffic of claim 16, wherein analyzing the network traffic based on the protocol comprises analyzing the network traffic to identify data requests and/or responses to the data requests.

18. The method of analyzing network traffic of claim 16, wherein the protocol includes HTTP.

19. The method of analyzing network traffic of claim 1, wherein collecting network traffic data associated with the filtered network element metric subset further comprises collecting the network traffic data related to the occurrence and attributes of transactions between network applications to diagnose network application performance issues.

20. A system for analyzing network traffic, the system comprising:
   one or more collector program modules that are implemented using at least one discrete hardware component and that are configured to identify a network connected process associated with network element metrics, and to filter the network element metrics based on a filtering criterion to establish a filtered network element metric subset; and
   a health data processing program module that is implemented on at least one discrete hardware component and that is configured to receive information corresponding to the filtered network element metric subset from at least one of the collector program modules and to collect network traffic data associated with the filtered network element metric subset, thereby reducing the network traffic data being collected to a subset of network traffic.

21. The system for analyzing network traffic of claim 20, wherein the filtered network element metric subset corresponds to the filtering criterion applied to network element metrics associated with a network connected process, and
   wherein the filtering criterion includes a port.

22. A computer program product for provisioning a health data processing module, the computer program product comprising:
   a computer readable storage hardware having computer readable program code embodied therein, the computer readable program code comprising:
   computer readable program code that is configured to receive information corresponding to a filtered network element metric subset from a collector module that is configured to identify a network connected process associated with network element metrics, and to filter the network element metrics based on a filtering criterion to establish a filtered network element metric subset; and
   computer readable program code that is configured to analyze network traffic data based on the information corresponding to the filtered network element metric subset,
   wherein the computer readable program code is further configured to collect network traffic data for network traffic that is based on the protocol, thereby reducing the network traffic data being collected to a subset of total network traffic.

23. The computer program product according to claim 22, wherein the filtering criterion includes a port used by the network connected process, and
   wherein the computer readable program code is further configured to collect network traffic data for network traffic received on the port.

24. The computer program product according to claim 22, wherein the filtering criterion includes a port used by the network connected process and a protocol used by the network connected process, and
   wherein the computer readable program code is further configured to collect network traffic data for network traffic on the port based on the protocol.

25. A computer program product for provisioning a collector module, the computer program product comprising:
   a computer readable storage hardware having computer readable program code embodied therein, the computer readable program code comprising:
   computer readable program code that is configured to determine that an network connected process is running, wherein the network connected process is associated with network element metrics;
   computer readable program code that is configured to identify, based on configuration information, a filtering criterion that corresponds to a network traffic type;
   computer readable program code that is configured to filter the network element metrics based on the filtering criterion to establish a filtered network element metric subset; and
   computer readable program code that is configured to communicate the filtered network element metric subset to a health data processing module to collect network traffic data associated with the filtered network element metric subset,
   wherein the computer readable program code is configured to generate the filtered network element metric subset based on the filtering criterion applied to network element metrics associated with the network connected process, and
   wherein the computer readable program code is configured to identify the filtering criterion that corresponds to the network traffic type by identifying a protocol used by the network connected process.

26. The computer program product according to claim 25, wherein the computer readable program code is configured to identify the filtering criterion that corresponds to the network traffic type by identifying a port used by the network connected process.

* * * * *